US008676189B2

(12) United States Patent
Lawler et al.

(10) Patent No.: US 8,676,189 B2
(45) Date of Patent: *Mar. 18, 2014

(54) CONVERGED MOBILE-WEB COMMUNICATIONS SOLUTION

(75) Inventors: Bruce D. Lawler, Kirkwood, CA (US); Krishnakant M. Patel, Richardson, TX (US); Brahmananda R. Vempati, Dallas, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 787 days.

This patent is subject to a terminal disclaimer.

(21) Appl. No.: 12/359,861

(22) Filed: Jan. 26, 2009

(65) Prior Publication Data

US 2009/0209235 A1 Aug. 20, 2009

Related U.S. Application Data

(60) Provisional application No. 61/023,332, filed on Jan. 24, 2008.

(51) Int. Cl.
*H04W 4/00* (2009.01)
(52) U.S. Cl.
USPC ............ 455/426.2; 455/426.1; 455/445; 455/462; 455/465; 370/328
(58) Field of Classification Search
USPC ........ 455/416, 414.1, 413, 466, 426.1, 426.2, 455/445, 465; 370/328–338
See application file for complete search history.

(56) References Cited

U.S. PATENT DOCUMENTS

| 3,912,874 | A | 10/1975 | Botterell et al. |
| 4,796,293 | A | 1/1989 | Blinken et al. |
| 5,353,328 | A | 10/1994 | Jokimies |
| 5,442,809 | A | 8/1995 | Diaz et al. |
| 5,546,449 | A | 8/1996 | Hogan et al. |
| 5,711,011 | A | 1/1998 | Urs et al. |
| 5,987,318 | A | 11/1999 | Alperovich et al. |
| 6,011,976 | A | 1/2000 | Michaels et al. |
| 6,021,326 | A | 2/2000 | Nguyen |
| 6,138,011 | A | 10/2000 | Sanders, III et al. |

(Continued)

FOREIGN PATENT DOCUMENTS

| JP | 2003-92776 | 3/2003 |
| WO | 00/79825 | 12/2000 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner* — Mahendra Patel
*Assistant Examiner* — Quan M Hua
(74) *Attorney, Agent, or Firm* — Gates & Cooper LLP

(57) ABSTRACT

A converged mobile-Web communications solution interfaces to both a mobile phone network and an Internet or Intranet network, so that services that are provided to mobile phones in the mobile phone network are also provided to Web clients in the Internet or Intranet network.

22 Claims, 13 Drawing Sheets

(56) References Cited

U.S. PATENT DOCUMENTS

| | | |
|---|---|---|
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,996,414 B2 | 2/2006 | Vishwanathan et al. |
| 7,026,926 B1 | 4/2006 | Walker, III |
| 7,043,266 B2 | 5/2006 | Chaturvedi et al. |
| 7,085,364 B1 | 8/2006 | Ahmed et al. |
| 7,099,291 B2 | 8/2006 | Harris et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,366,535 B2 | 4/2008 | Glass et al. |
| 7,403,775 B2 * | 7/2008 | Patel et al. ............. 455/432.1 |
| 7,529,557 B2 | 5/2009 | Farrill |
| 7,689,238 B2 * | 3/2010 | Biswas et al. .............. 455/518 |
| 7,738,896 B2 * | 6/2010 | Patel et al. ................. 455/519 |
| 7,764,950 B2 * | 7/2010 | Patel et al. ............... 455/414.1 |
| 7,787,896 B2 * | 8/2010 | Kundu et al. ............... 455/518 |
| 7,797,010 B1 * | 9/2010 | Manroa et al. ............. 455/519 |
| 7,813,722 B2 * | 10/2010 | Patel et al. ............... 455/414.2 |
| 8,036,692 B2 * | 10/2011 | Ayyasamy et al. .......... 455/518 |
| 8,369,829 B2 * | 2/2013 | Nagubhai et al. .......... 455/406 |
| 2001/0005372 A1 | 6/2001 | Cave et al. |
| 2002/0077136 A1 | 6/2002 | Maggenti et al. |
| 2002/0086659 A1 | 7/2002 | Lauper |
| 2002/0187750 A1 * | 12/2002 | Majumdar ................... 455/41 |
| 2002/0196781 A1 * | 12/2002 | Salovuori .................. 370/352 |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0148779 A1 | 8/2003 | Aravamudan et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0152441 A1 | 8/2004 | Wong |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 * | 11/2005 | Patel et al. .................. 370/335 |
| 2005/0261016 A1 | 11/2005 | Patel et al. |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 * | 2/2006 | Biswaas ....................... 455/518 |
| 2006/0056361 A1 | 3/2006 | Jiang et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0189337 A1 | 8/2006 | Farrill et al. |
| 2006/0198334 A1 * | 9/2006 | Civanlar et al. .............. 370/328 |
| 2006/0234687 A1 | 10/2006 | Patel et al. |
| 2007/0037597 A1 | 2/2007 | Biswas et al. |
| 2007/0037598 A1 | 2/2007 | Ayyasamy et al. |
| 2007/0070976 A1 * | 3/2007 | Mussman et al. ........... 370/351 |
| 2007/0154005 A1 * | 7/2007 | Daigle ..................... 379/211.04 |
| 2007/0190984 A1 | 8/2007 | Ayyasamy et al. |
| 2007/0197234 A1 | 8/2007 | Gill et al. |
| 2007/0253347 A1 | 11/2007 | Patel et al. |
| 2008/0064364 A1 | 3/2008 | Patel et al. |
| 2008/0147671 A1 * | 6/2008 | Simon et al. ................... 707/10 |
| 2008/0299953 A1 * | 12/2008 | Rao ............................ 455/414.1 |
| 2009/0092116 A1 | 4/2009 | Jiang et al. |
| 2009/0149167 A1 | 6/2009 | Patel et al. |
| 2009/0209235 A1 | 8/2009 | Lawler et al. |
| 2010/0234018 A1 * | 9/2010 | Lawler et al. ............. 455/426.1 |

FOREIGN PATENT DOCUMENTS

| | | |
|---|---|---|
| WO | 02/101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |

OTHER PUBLICATIONS

Nokia: "What is TETRA? Why Nokia TETRA?", The Nokia TETRA Primer, 2002, pp. 1-29. XP002345778 http.//www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.Com, Oct. 2002, pp. 1-1. XP002345781 http://www.trackwell.com/news/news_twandtetra.htm.

\* cited by examiner

CONVERGED MOBILE-WEB COMMUNICATIONS SOLUTION

CROSS REFERENCE TO RELATED APPLICATIONS

This application claims the benefit under 35 U.S.C. Section 119(e) of the following and commonly-assigned patent application:

U.S. Provisional Application Ser. No. 61/023,332, filed on Jan. 24, 2008, by Bruce D. Lawler, Krishnakant M. Patel, Brahmananda R. Vempati, entitled "CONVERGED MOBILE-WEB COMMUNICATIONS SOLUTION,";

which application is incorporated by reference herein.

This application is related to the following co-pending and commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK", which application claims the benefit under 35 U.S.C. Section 365 of P.C.T. International Application Serial Number PCT/US03/16386 (154.4-WO-U1), which application claims the benefit under 35 U.S.C. Section 119(e) of U.S. Provisional Application Ser. Nos. 60/382,981 (154.3-US-P1), 60/383,179 (154.4-US-P1) and 60/407,168 (154.5-US-P1);

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS", which application claims the benefit under 35 U.S.C. Section 365 of P.C.T. International Application Serial Number PCT/US04/23038 (154.7-WO-U1), which application claims the benefit under 35 U.S.C. Section 119(e) of U.S. Provisional Application Ser. Nos. 60/488,638 (154.7-US-P1), 60/492,650 (154.8-US-P1) and 60/576,094 (154.14-US-P1) and which application is a continuation-in-part and claims the benefit under 35 U.S.C. Sections 119, 120 and/or 365 of P.C.T. International Application Serial Number PCT/US03/16386 (154.4-WO-U1);

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS", which application claims the benefit under 35 U.S.C. Section 119(e) of U.S. Provisional Application Ser. Nos. 60/569,953 (154.9-US-P1) and 60/579,309 (154.15-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS", now U.S. Pat. No. 7,403,775, issued Jul. 22, 2008, which application claims the benefit under 35 U.S.C. Section 119(e) of U.S. Provisional Application Ser. No. 60/571,075 (154.10-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK", which application claims the benefit under 35 U.S.C. Section 119(e) of U.S. Provisional Application Ser. Nos. 60/573,059 (154.11-US-P1) and 60/576,092 (154.12-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/129,268 (154.10-US-U1);

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS", which application claims the benefit under 35 U.S.C. Section 119(e) of U.S. Provisional Application Ser. No. 60/573,780 (154.13-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/134,883 (154.11-US-U1);

U.S. Utility application Ser. No. 11/158,527, filed Jun. 22, 2005, by F. Craig Farrill, entitled "PRESS-TO-CONNECT FOR WIRELESS COMMUNICATIONS SYSTEMS", which application claims the benefit under 35 U.S.C. Section 119(e) of U.S. Provisional Application Ser. No. 60/581,954 (154.16-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS", which application claims the benefit under 35 U.S.C. Section 119(e) of U.S. Provisional Application Ser. No. 60/588,464 (154.17-US-P1);

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS", which application claims the benefit under 35 U.S.C. Section 119(e) of U.S. Provisional Application Ser. No. 60/654,271(154.18-US-P1);

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE", which application claims the benefit under 35 U.S.C. Section 119(e) of U.S. Provisional Application Ser. No. 60/666,424 (154.19-US-P1);

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS", which application claims the benefit under 35 U.S.C. Section 119(e) of U.S. Provisional Application Ser. No. 60/705,115 (154.20-US-P1);

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM", which application claims the benefit under 35 U.S.C. Section 119(e) of U.S. Provisional Application Ser. No. 60/706,265 (154.21-US-P1);

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS", which application claims the benefit under 35 U.S.C. Section 119(e) of U.S. Provisional Application Ser. No. 60/742,250 (154.23-US-P1);

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM", which application claims the benefit under 35 U.S.C. Section 119(e) of U.S. Provisional Application Ser. No. 60/795,090 (154.26-US-P1);

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS", which application claims the benefit under 35 U.S.C. Section 119(e) of U.S. Provisional Application Ser. No. 60/836,521 (154.27-US-P1); and U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK", which application claims the benefit under 35 U.S.C. Section 119(e) of U.S. Provisional Application Ser. Nos. 60/982,650 (154.32-US-P1) and 61/023,042 (154.32-US-P2);

all of which applications are incorporated by reference herein.

BACKGROUND OF THE INVENTION

1. Field of the Invention

This invention relates in general to wireless communications systems, and more specifically, to a converged mobile-Web communications solution.

2. Description of Related Art

Current market dynamics indicate that Web 2.0 trends will impact mobile phone communications. Specifically, it is expected that web-based applications will displace at least some core wireless services.

Nonetheless, web-based applications often ignore key components of wireless communications networks. For example, Web 2.0 trends include new virtual online communities for social networking, but typically ignores consumers' most important main network, namely contacts on their mobile phones, which are a constant personal communications companion for most people.

Nonetheless, web-based applications do provide value-added communications and messaging services heretofore found in communications networks, including:

Long-distance bypass,
Conferencing,
Instant Messaging (IM),
Voice messaging to any phone, and
Short Message Service (SMS), i.e., texting, and Group SMS.

However, there is a functionality gap between such web-based applications and mobile phone communications:

| | Web 2.0 Trends | Mobile Phone Communications |
|---|---|---|
| Content | Content stored, archived, tagged, and threaded | Voicemail and text messages deleted; Conversations never stored |
| | Information associated with identity and creativity | No mechanism for "showing off" and obtaining validation |
| | Private information can be made selectively public | All contents are private |
| | Online network of means communication | Contact list is just a of calling and text messges - there is no mechanism for sharing with others or interlinking |
| Text Communication | 1:Many; Many:Many; Many:1 | Primarily 1:1 |
| | From long to snack-size text | No threading for snack-size information |
| Presence | Device and user status | Focus only on the applications, not the device or the user's status |

Thus, notwithstanding the innovations found in web-based applications, there is a need in the art for improvements to these services, as well as additional services, that leverage existing and emerging wireless communications functionality and provide superior user experiences. The present invention aims to satisfy this need by providing a converged mobile-Web communications solution, combining the best of both worlds.

SUMMARY OF THE INVENTION

To overcome the limitations in the prior art described above, and to overcome other limitations that will become apparent upon reading and understanding the present specification, the present invention discloses a converged mobile-Web communications solution. Specifically, the system of the present invention interfaces to both a mobile phone network and an Internet or Intranet network, so that services that are provided to the mobile phone in the mobile phone network are also provided to the Web client in the Internet or Intranet network. These services include: providing the Web client with access to the mobile phone's contacts; providing the Web client with access to the mobile phone's text messaging; allowing the Web client to send text messages to one or more recipient mobile phones in the mobile phone network; providing the Web client with access to the mobile phone's voice messaging; allowing the Web client to send multimedia files to one or more recipient mobile phones in the mobile phone network; allowing the Web client to place a group call to a plurality of recipient mobile phones in the mobile phone network; performing simultaneous ringing to both the mobile phone in the mobile phone network and the Web client in the or Intranet network; transferring calls from the mobile phone in the mobile phone network to the Web client in the or Intranet network; transferring calls from the Web client in the or Intranet network to the mobile phone in the mobile phone network; and synchronizing data between the mobile phone in the mobile phone network and the Web client in the or Intranet network. These and other aspects of the present invention are described in more detail below.

BRIEF DESCRIPTION OF THE DRAWINGS

Referring now to the drawings in which like reference numbers represent corresponding parts throughout.

DETAILED DESCRIPTION OF THE INVENTION

Figure 1:
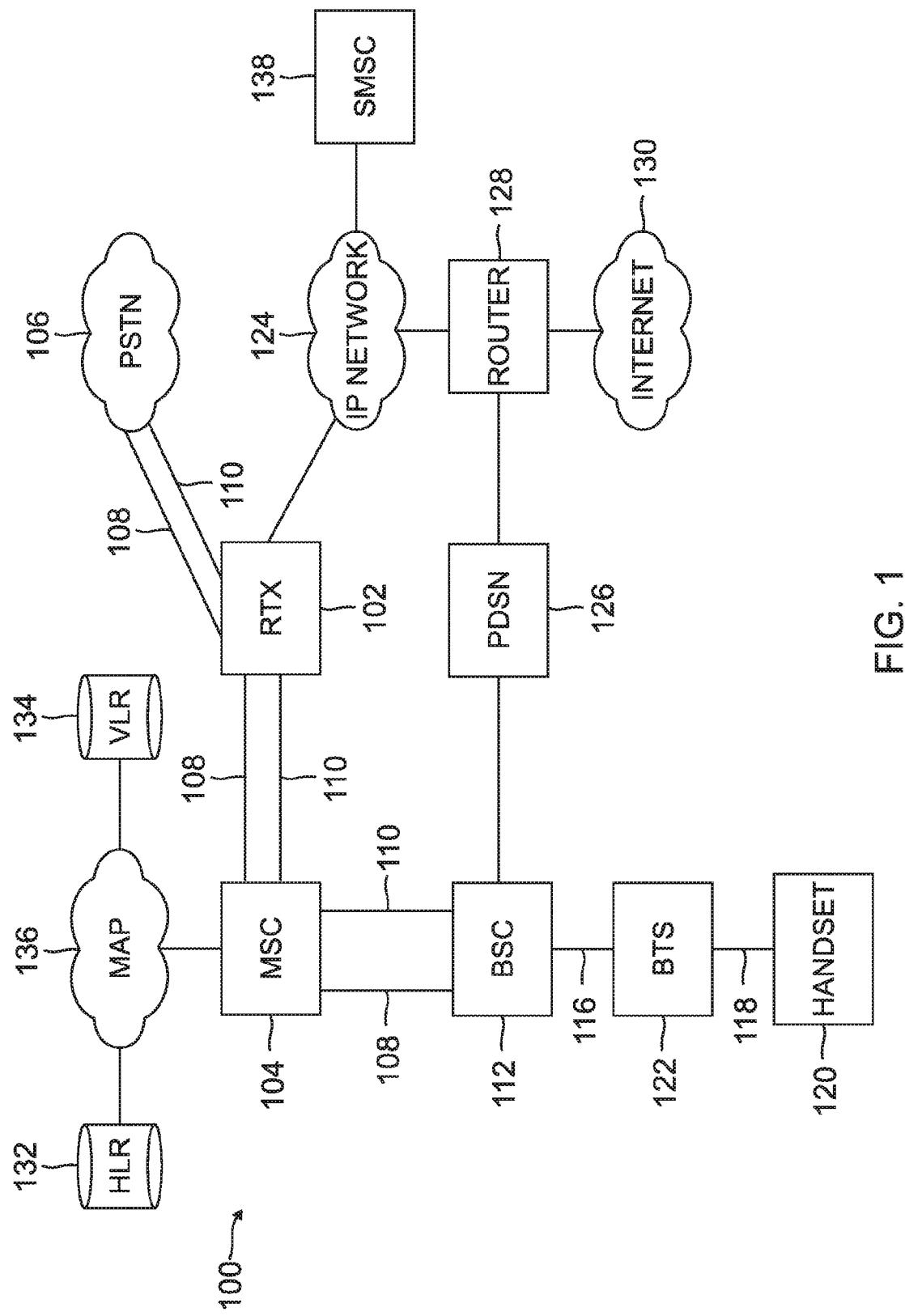
FIG. 1 is a block diagram that illustrates an exemplary embodiment of a wireless communications network according to an embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1. Overview 1.1. Acronyms and Messaging

In the following sections, a number of industry-standard acronyms are used, including the following:
ACM: Address Complete Message,
ACK: Acknowledgement,
AGC: Advanced Group Connect,
AGS: Advanced Group Services,
ANM: Answer Message,
AVS: Advanced Voice Services,
Connect: Connect to the terminating number provided in the message,
Continue: Continue call processing,
Data_SM: Data Short Message,
Deliver_SM: Deliver Short Message,
DTMF: Dual-Tone Multi-Frequency
FMC: Fixed Mobile Convergence,
FSM: Forward Short Message,
HTTP: Hypertext Transfer Protocol,
IAM: Initial Address Message,
IDP: Initial Detection Point,
IDP_SM: Initial Detection Point for SMS,
IM: Instant Messaging,
IMS: IP Multimedia Subsystem,
IN: Intelligent Network,
MDN: Mobile Directory Number,
MO_SM: Mobile Originating Short Message,
RLC: Release Complete Message,
REL: Release Message,
SCA: Service Center Address,
SIP: Session Initiation Protocol, and
SMS: Short Message Service.

Voice call related messages in the following call flows include: Setup, Originating, Terminating, IAM, Alerting, ACM, Connect, ANM, Disconnect, REL, release, Disconnect Ack, and RCL release complete.

SMS related messages in the following call flows include: MO-SM, FSM (a.k.a. Fwd_SM), Data_SM, Deliver_SM, and MT_SM.

IN related messages in the following call flows include: IDP, Connect, Continue, release, and IDP_SM.

1.2. Technical Highlights

The present invention discloses a converged mobile-Web communications solution, as well as a suite of applications, used both with mobile phones that operate within a mobile phone network and Web clients that operate within Internet/Intranet networks. Specifically, the present invention provides brings mobile phone services to the Web clients.

Preferably, the present invention includes a number of key features and functionality, including:
Contact/Group Management:
  Handset/Web Client synchronization,
  Presence notification (handset+Web client),
Mirror of Handset-based Messaging:
  Voice SMS,
  Text SMS,
IM Support and Integration:
  SMS delivered to IM,
  IM conversation delivered to a handset using SMS,
Messaging Delivery to E-mail:
  Voice and text SMS,
  Video, audio and images,
  Reply via e-mail,
FMC Voice Communications:
  Call waiting on a Web client,
  Group call capabilities from a Web client, Multimedia Management:
  Video, audio and image delivery to both the handset and the Web client,
  Voice SMS as attachments,
Message Management:
  Threading, sorting, searching, and history.

These and other aspects of the present invention are described in more detail below.

1.3. Wireless Communications Network Architecture

FIG. 1 is a block diagram that illustrates an exemplary embodiment of a wireless communications network according to an embodiment of the present invention. This network is described in more detail in the cross-referenced applications set forth above in reference to the provision of Advanced Voice Services (AVS), also known as Advanced Group Services (AGS), such as two-way half-duplex voice calls within a group, also known as Push-to-Talk (PTT) or Press-to-Talk (P2T), as well Advanced Group Connect (AGC) functions, such as Push-to-Conference (P2C) or Instant Conferencing (IC), Push-to-Message (P2M), Voice SMS (VSMS), Group SMS (GSMS) with Reply to Sender, Scheduled Conference (SC), Group SMS Chat With Reply All and Address Book backup and restore. However, the functionality of this network can also be used to provide the converged mobile-Web communications solution according to one embodiment of the present invention.

Within the network 100, an RTX 102, also known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of a call. The use of TFO ensures high voice quality (as voice vocoder conversion is avoided) between mobile-to-mobile calls.

When a subscriber originates a call, the MSC 104 routes the call to the RTX 102. The MSC 104 also requests the BSC 112 via 116 to establish a radio traffic path 118 with a handset 120 (also known as a mobile phone, mobile station or mobile unit) via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the call request to the RTX 102), the RTX 102 identifies the terminating group users and their numbers, which may comprise an MS-ISDN (Mobile Station—Integrated Services Digital Network) number, an IMSI (International Mobile Subscriber Identity) number, or an MDN (Mobile Directory Number).

The RTX 102 sends an ISUP call origination request for each terminating handset 120. It may send requests directly to the MSC 104, PSTN 106 or IP network 124 via a PDSN (Public Data Switched Network) 126, Router 128, and/or Internet/Intranet 130, depending on the routing table configuration for terminating numbers. Once the bearer path 110 is established, the RTX 102 begins a negotiation with the far end (in this case, the terminating BSC 112) for each terminating leg to a handset 120.

Once bearer paths 110 are established for originating and terminating legs for a call, the RTX 102 switches (or duplicates) voice or data from the originating handset 120 to all terminating handsets 120.

The RTX 102 may also use an IP network 124 or the Internet/Intranet 130. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a handset 120 to the RTX 102 (because it would require changes in the MSC 104), the latter does not have any information of the registered handset 120. To circumvent this issue, a registration and presence application runs over an IP stack in the handset 120. After the handset 120 registers for a data interface (i.e., obtaining an IP address) with the PDSN 126 (or Serving GSM Service Nodes (SGSN) in the case of GSM networks), the registration and presence application in the handset 120 registers with the RTX 102 using its IP address. The RTX 102 also uses this IP interface to update the presence information to a handset 120.

An alternative embodiment may use the SMS (Short Message Service) transport to carry presence messages over a data channel. The RTX 102 interacts with the handset 120 using predefined presence application related messages that are transported as SMS messages. The same messages can be transported via the PDSN 126 interface, if users have data service.

During roaming, a Home Location Register (HLR) 132 and Visitor Location Register (VLR) 134 can be accessed via the MSC 104 and a MAP link 136. The HLR 132 and VLR 134 are used to track the handsets 120 within home or foreign networks, while the RTX 102 is used to track the presence of members of a group within the home or foreign networks and updates the handsets 120 for those members with the network availability of other members of the group.

A Short Message Service Center (SMSC) 138 is accessible via the IP network 124 (or other element) for the storage of text messages (SMS messages). When an SMS message is sent to a handset 120, the message is first stored in the SMSC 138 until the recipient handset 120 is available (e.g., a store-and-forward option).

1.4. Real Time Exchange

Figure 2:
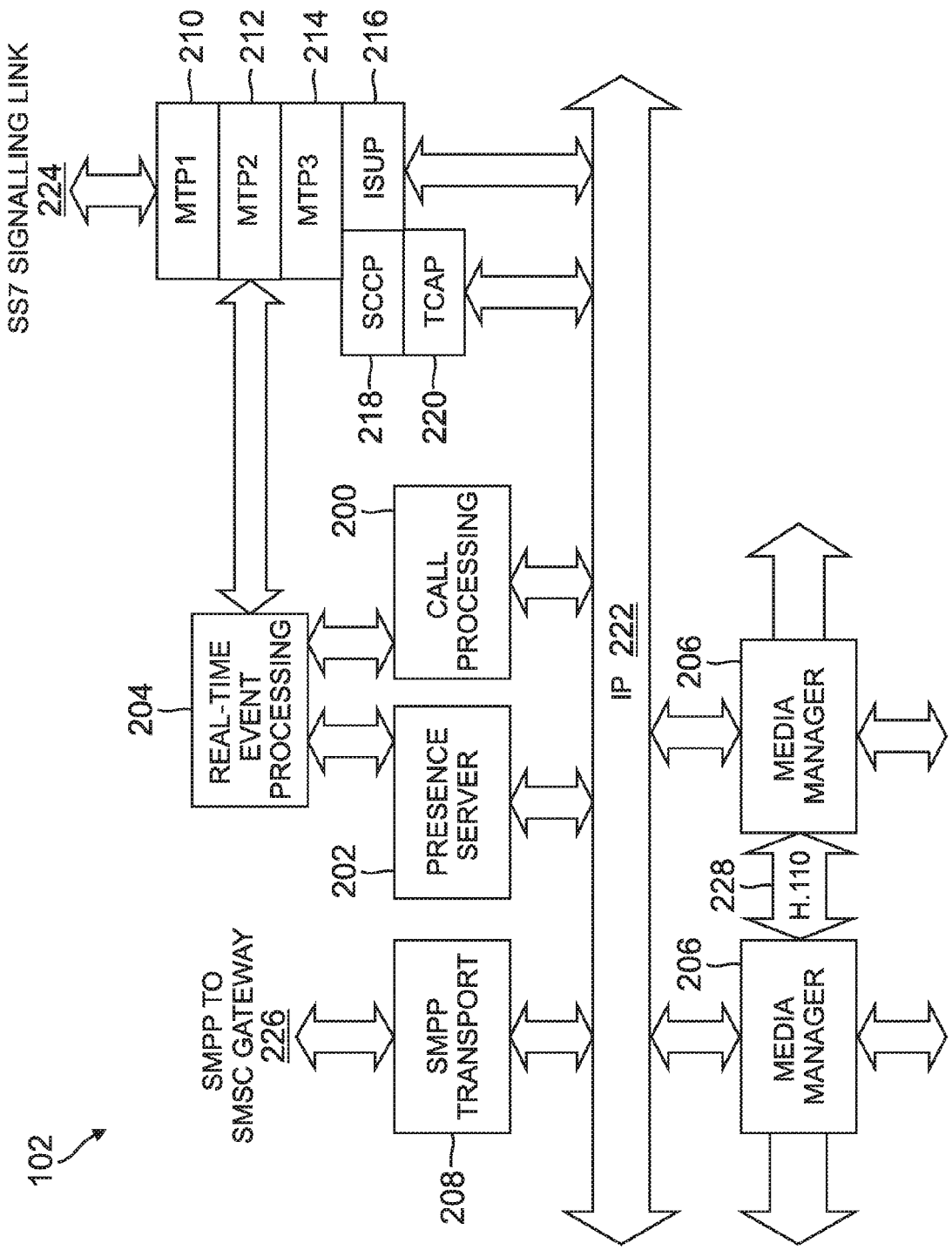
FIG. 2 illustrates a proposed architecture for a Real-Time Exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in more detail below, as well as in the co-pending and commonly-assigned patent applications cross-referenced above and incorporated by reference herein.

The originating handset 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating handset 120 has subscribed to the AVS, AGS or AGC service before originating the call. Upon confirmation, the Call Processing system 200 initiates a new call. The Call Processing system 200 interacts with the Presence Server 202 and Real-Time Event Processing system 204 to cause the wireless network 100 to perform call setup with the terminating handsets 120 for the call, and thereafter to manage the call.

During the call, the Call Processing system 200 interacts with the Media Manager systems 206 to maintain the H.110 channels 227 and assign any additional H.110 channels 228 required for the call, which may span across multiple Media Manager systems 206. During the call, the Media Manager systems 206 of the RTX 102 are used to mix audio streams between the originating handset 120 and the terminating handset 120, and then deliver these mixed audio streams to the originating handset 120 and the terminating handset 120. The H.110 channels 228 are used for passing mixed and unmixed audio streams voice between the Media Manager systems 200 as required.

1.5. Handset Components

Figure 3:
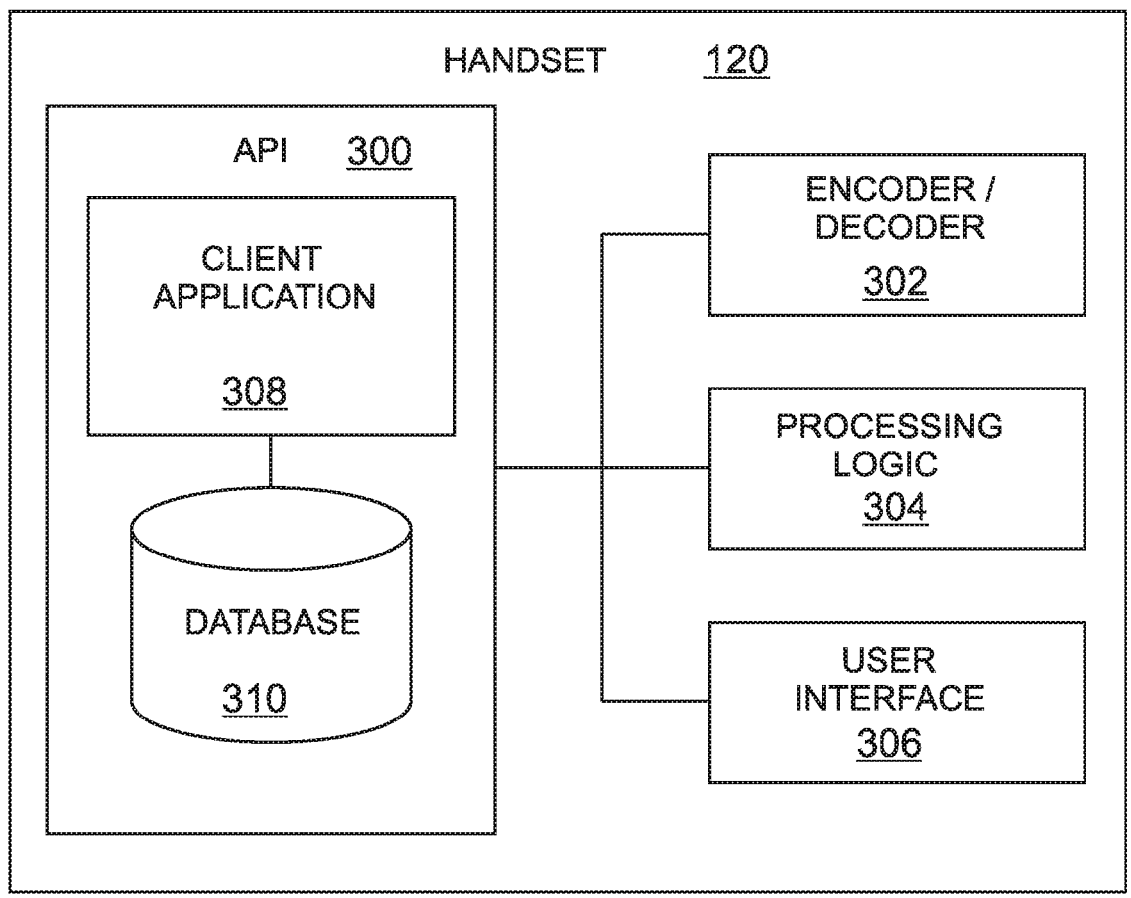
FIG. 3 illustrates the high-level functional components and their interfaces in a mobile station or handset according to an embodiment of the present invention.

FIG. 3 illustrates the high-level functional components and their interfaces in the handset 120 according to an embodiment of the present invention. In one embodiment, the software architecture used in the handset 120 is based on an Open OS implementation and is available under multiple operating systems, including JAVA, WINDOWS MOBILE, SYMBIAN and BREW.

Preferably, the software architecture used in the handset 120 provides an application programming interface (API) 300 that supports the logic and data required within the handset 120 for providing cellular service, including the functions necessary for the making a call generally, and for providing the AVS, AGS or AGC services specifically.

The high-level functional components of the handset 120 include an encoder/decoder 302, processing logic 304 and user interface 306. A client application 308 is provided on the SIM 300 that supports AVS, AGS or AGC functionality for the handset 120. In addition, the SIM 300 stores a database 310, which includes an address book, contacts and/or group information.

At power-on, the handset 120 loads the client application 308 necessary to support the AVS, AGC or AGC services. This functionality provided includes the "look and feel" of the menu displays on the handset 120, as well as user interaction with the menu displays.

During operation, the encoder/decoder 302 decodes and encodes messages, and populates specific data structures in the handset 120. The encoder/decoder 302 checks the validity of the incoming messages by verifying mandatory parameters for each of the incoming messages. A message will not be processed further if the encoder/decoder 302 fails to decode the message.

The processing logic 304 handles normal calls, as well as all the AVS, AGS or AGC related functionalities. The processing logic 304 implementation is device-specific and vendor-specific, and it interacts with the other components, including the encoder/decoder 302, user interface 306, client application 308 and database 310.

The processing logic 304 provides an auto-answer mechanism for calls. Specifically, when a call is received, the processing logic 304 automatically answers the call. The processing logic 304 makes use of call notification for incoming call detection and, based on various parameters received within the call notification, determines whether the call is a normal call or an AVS, AGS or AGC call. The processing logic 304 performs the necessary processing based on this determination.

In addition, the processing logic 304 provides SMS destination control based on the type of subscriber. At the time of subscriber data provisioning, if it is determined that the handset 120 will use AVS, AGS or AGC based logic, then appropriate logic is invoked in the RTX 102 to send presence messages over SMS to the handset 120. Similarly, the handset 120 is configured at the time of provisioning to receive/accept such SMS and respond to the RTX 102 appropriately.

Finally, the processing logic 304 also enables subscribers to track the presence of contacts and members of a group on their handset 120, and provides a mechanism and API to carry-out contacts and group management operations on the handset 120, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, etc. The other components of the handset 120 may interact with the database 310 to retrieve/update the group, members and presence information for various operations. The database 310 also has pointers to the native address book on the handset 120, to provide seamless "alias" naming for contacts used with normal calls, as well as AVS, AGS or AGC services.

The user interface 306 provides a mechanism for the user to view and manage groups, group members, contacts, presence and availability. The user interface 306 also makes it possible to invoke the AVS, AGS or AGC services from the group/contact list screens, as described in more detail below.

2. A Converged Mobile-Web Communications Solution

The functionality of the converged mobile-Web communications solution according to one embodiment of the present invention includes the following:

| | |
|---|---|
| Contacts | Back-up of contacts online. |
| | Never have to worry about losing contacts if handset is lost. |
| | No need to transfer contacts from one handset to another. |
| Text Messaging | Type from the convenience of a Web client and send a single message to a group all at once. |
| | Messages are all threaded. |

-continued

| | |
|---|---|
| Voice Messaging | Add a personal touch to a message using voice. Send it to recipients' handsets, IM accounts, and/or e-mail addresses as an attachment. |
| Multimedia File Attachments | Easily attach multimedia content to a message. Send it to any mobile subscribers with or without a computer. |
| Group Voice Calls | Flexibility of making an easy group voice call from a computer (with a microphone). No need to pay expensive international voice call rates while traveling overseas. |
| Message Retrieval | No more worry about having to delete old messages on the handset. All text and voice messages are saved online and can be archived/searched. |

The components that work together to provide the functionality of the converged mobile-Web communications solution according to one embodiment of the present invention are described in more detail in the following sections.

2.1. Network Architecture

Figure 4:
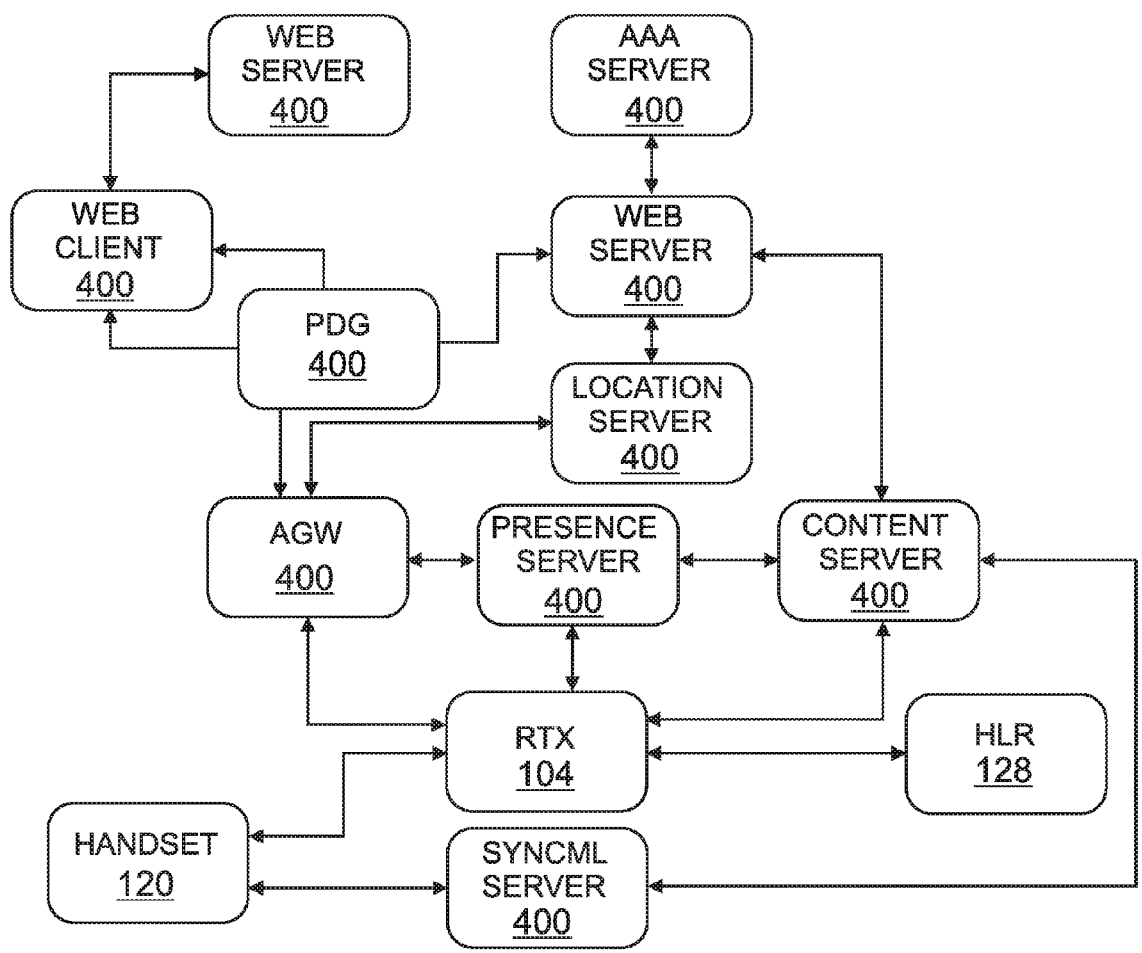
FIG. 4 is a block diagram that illustrates an extension to the network 100 architecture used for one embodiment of the present invention.

FIG. 4 is a block diagram that illustrates an extension to the network 100 architecture used for one embodiment of the present invention. In this diagram, the extension to network 100 architecture includes the components from FIG. 1 (although only the RTX 102, handset 120 and HLR 132 are shown), as well as other components including a Web Client 400, Access Gateway (AGW) 402, Packet Data Gateway (PDG) 404, Web Server 406, Presence Server 408, Location Server 410, SyncML Server 412 and Content Server 414. These other components are typically implemented within the Internet/Intranet 130 and/or IP network 124, although they may be implemented with the network 100 itself, the PSTN 106, and/or the PDSN 126. The operation of these components is described in more detail below.

Generally, the network 100 is used for making calls and exchanging data to and from the handsets 120, wherein the calls are made and the data is exchanged using connections that are initiated by call setup and in-band signaling within the network 100 and frames for the calls and the data are switched to and from the handsets 120 by the MSC 104 across bearer paths 110 in the network 100. The network 130 is used for exchanging data to and from the Web Clients 400, wherein the data are packet switched within the network 130. The remaining components 402, 404, 406, 408, 410 412, and 414, together comprise the means, that interface to the network 100 and the network 130, for providing a converged mobile-Web communications solution to both the handsets 120 and the Web Clients 400, wherein the converged mobile-Web communications solution comprises services that are provided to the handset 120 in the network 100 that are also provided to the Web Clients 400 in the network 130. These services include, but are not limited to, the following:

providing a Web Client 400 with access to a handset's 120 contacts;
providing a Web Client 400 with access to a handset's 120 text messaging;
allowing a Web Client 400 to send text messages to one or more recipient handsets 120;
providing a Web Client 400 with access to a handset's 120 voice messaging;
allowing a Web Client 400 to send multimedia files to one or more recipient handsets 120;
allowing a Web Client 400 to place a group call to a plurality of handsets 120;
performing simultaneous ringing of call to a subscriber's handset 120 and Web Client 400;
transferring calls from a handset 120 to a Web Client 400;
transferring calls from a Web Client 400 to a handset 120; and
synchronizing data between a handset 120 and Web Client 400.

The implementation of these various services is described in more detail below.

2.2. Web Client

The Web Client 400 is preferably implemented on a computer, such as a desktop, laptop, or similar device, and contains two parts:

A web interface that displays the user's address-book and messages. This part communicates with the Web Server 406 over HTTP to fetch the data required for a view. The web interface does not store any data outside the HTTP session. Only data required for the current view is stored in memory. (It is similar to web mail interfaces.)

A browser plug-in containing a SIP client for all voice related features, which is downloaded via the web interface. The SIP plug-in registers with the network and can initiate and receive calls. The SIP plug-in also maintains SIP subscriptions which are used for obtaining presence and for receiving notifications about new messages that need to be displayed on the web interface.

2.3. Access Gateway (AGW)

The AGW 402 controls the path for all SIP signaling between the Web Client 402 and the RTX 102. The main function of the AGW 402 is to authenticate SIP messages. The SIP authentication is performed using the session ID established at the Web Server 406 by the Web Client 400. The AGW 402 also acts as a SIP registrar. The AGW 402 preferably comprises a set of redundant proxy servers/registrars.

Web Clients 400 receive SIP configuration from the Web Server 406. This configuration contains details of the AGW 402 to be contacted.

2.4. Packet Data Gateway (PDG)

The PDG 404 is a network 100 component, wherein the Web Client 400 establishes a secure IPSec tunnel with the PDG 404. All SIP communication from the Web Client 400, and optionally the HTTP traffic, will be routed through the secure IPSec tunnel.

2.5. Web Server

The Web Server 406 presents the user interface pages to the Web Client 400. It also provides the user with a SIP plug-in for installation. The Web Server 406 interfaces with the Content Server 414 to provide views of the user's address book and message inbox. However, the Web Server 406 does not store any user data permanently. All user data served by the Web Server 406 is obtained from the Content Server 414.

The Web Server 406 is also responsible for authenticating the user with the network. After it establishes an HTTP session with the Web Client 400, the Web Server 406 shares the session ID with the AGW 402 for authenticating SIP requests.

Multiple Web Servers 406 may be deployed to support high availability and redundancy.

A Web Server 406 may also be deployed in the public internet by the carrier (i.e., the Web Server 406 does not communication with the Web Client 400 through the PDG 404). This Web Server 406 will also serve the SIP plug-in and user interface pages to the Web Client 400.

2.6. Presence Server

The Presence Server 408 handles SIP subscriptions and publications from the Web Client 400. The main function of the Presence Server 408 is to off-load presence related messaging and dialog maintenance overheads from the RTX 102. The RTX 102 maintains the presence state of the user. The Presence Server 408 creates presence documents using the information stored on the RTX 102. The Presence Server 408 also updates the presence state on the RTX 102 when it receives presence publications from the Web Client 400. This Presence Server 408 works with, but should not be be confused with the Presence Server 202 that is part of the RTX 102.

2.7. RTX

The RTX 102 has a SIP adaptor that is capable of receiving and originating SIP calls to the Web Client 400. The SIP adaptor is integrated with the Call Processing 200 component, which can handle calls with simultaneous SIP and SS7 legs. The SIP adaptor is also capable of injecting SMS signals into the RTX 102, which is used for features such as Voice SMS (VSMS) deposit.

2.8. Location Server

The Location Server 410 stores information about a user's home RTX 102, Presence Server 408, and Content Server 414. The Location Server 410 is also used to store the session details for Web Clients 400. The AGW 402 uses this information to authenticate SIP messages using the session ID. The session ID is created by the Web Server 406 and is only read by the AGW 402. The AGW 402 cannot extend the life of the session ID directly. The SIP plug-in in the Web Client 400 will trigger "keep-alive" HTTP requests when calls are in progress to prevent HTTP session timeout. The session ID will be removed from the Location Server 410 by the Web Server 406 in case of a session timeout.

2.9. SyncML Server

The SyncML (Synchronization Markup Language) Server 412 handles SyncML connections from the handset 120 to synchronize the address book and other data between the handset 120 and the Content Server 414.

2.10. Content Server

The Content Server 414 archives all messages belonging to a user. It also holds a view of the user's address book and the messages stored on the handset 120. The Content Server 414 may be a distributed data store. It will interface with the SyncML Server 412 to maintain synchronization with the data from the handset 120.

The RTX 102 copies all AGC communication sent to users with their Content Server 414. The Web Server 406 will fetch data to be displayed by the Web client 400 from the Content Server 414.

3. Web Client Configuration

The Web Client 400 expects the following configuration from the Web Server 406 after authentication:
1. Access numbers for the various services.
2. DTMF patterns for call transfer.
3. Configured numbers for call transfer (mobile and landline numbers).
4. AGW 402 details.

4. Message Flows

The following sections describe the following message flows:
1. Web Server 406 registration and SIP registration.
2. Call initiation from the Web Client 400 for AGC services.
3. Call termination to the Web Client 400 for AGC services.
4. Simultaneous ringing of the handset 120 and the Web client 400.
5. Call transfer to alternate number.
6. Call hold.
7. Presence publication.
8. Presence subscription.
9. AGC features notifications to the Web Client 400.
10. Data synchronization from the handset 120 using the SyncML Server 412.
11. Data synchronization from the Web Client 400 using an HTTP mechanism.

4.1. Registration

Figure 5:
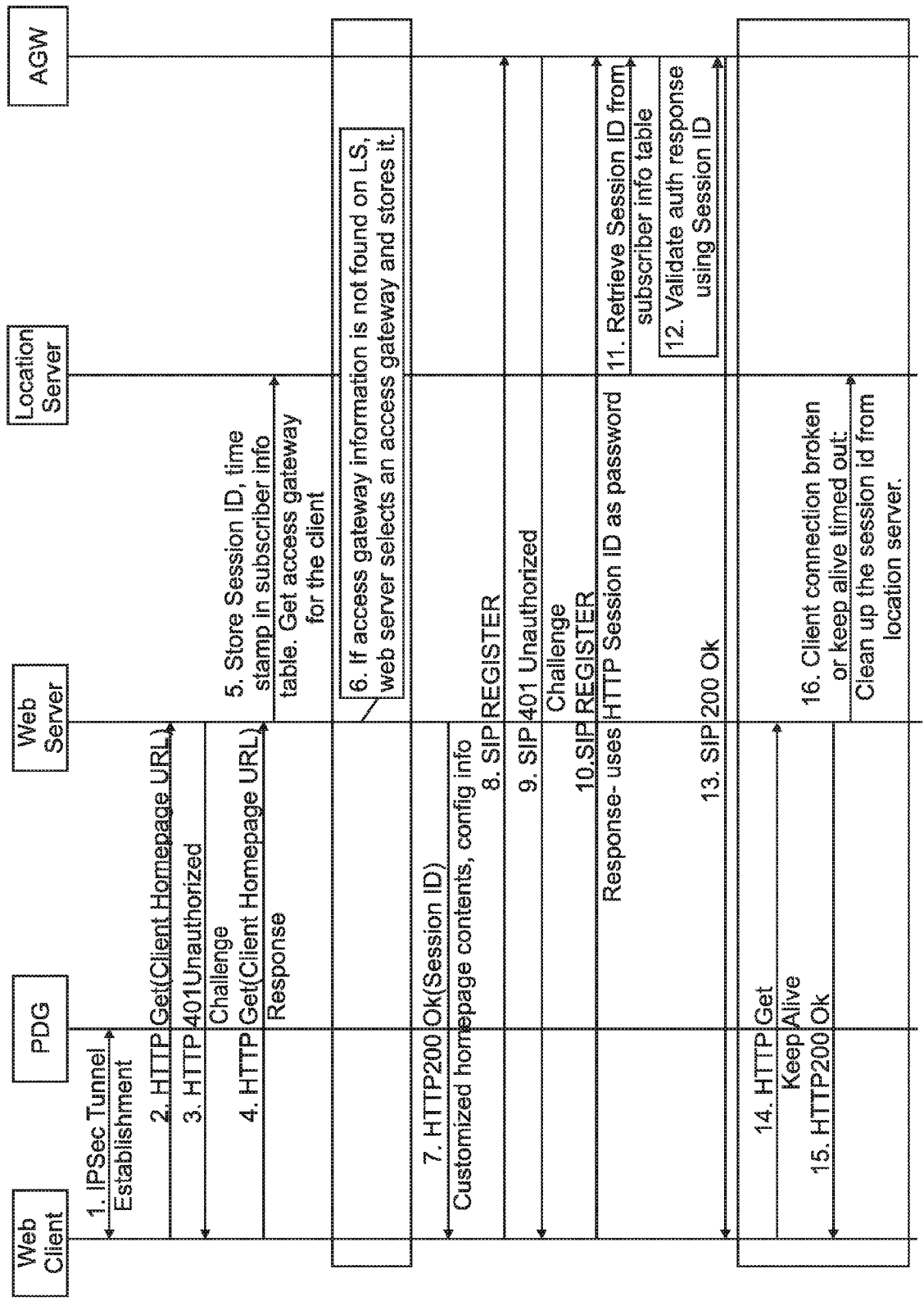
FIG. 5 is a call flow diagram that illustrates the steps performed during Registration in one embodiment of the present invention.

FIG. 5 is a call flow diagram that illustrates the steps performed during Registration in one embodiment of the present invention. The steps include the following:
1. An IPSec tunnel is established.
2. After the IPSec tunnel is established, the Web Client 400 requests the web pages for the Web Client 400.
3. The Web Server 406 receives the request and issues a challenge to the Web Client 400 for authentication.
4. The Web Client 400 receives and responds to the challenge:
   Option 1: The Web Client 400 retrieves the authentication credentials, for example, from a USB device, and resends the web page request with these details.
   Option 2: The Web Client 400 displays a dialog box for the user to enter the username and password. When the user enters these details, the Web Client 400 resends the web page request with these details.
5. The Web Server 406 verifies the received authentication credentials and, if successful, stores the session id and the time stamp for the session id in a subscriber information table in the Location Server 410.
6. The Web Server 406 then checks for the AGW 402 information for the user on the Location Server 410. If AGW 402 information is not available, then the Web Server 406 selects an AGW 402 to communciate with the Web Client 400 and stores the information in the Location Server 410.
7. The Web Server 406 creates and sends a customized web page for that user. As part of the response, the Web Client 400 also receives other configuration information such as the identity of the AGW 402, access numbers for various features, etc.
8. The Web Client 400 initiates SIP registration.
9. The AGW 402 challenges the Web Client 400 for authentication.
10. The Web Client 400 uses the user name entered previously and uses the session id as the password for generating the response. It then resends the registration request with this response.
11. The AGW 402 retrieves the session id from the Location Server 410 for the specified user name.
12. The AGW 402 then validates the authentication response using the retrieved session id.
13. If this is successful, the AGW 42 accepts the registration. The Web Client 400 can now make and receive calls, including AGC calls, through the Web Client 400.
14. The Web Client 400 sends a "keep-alive" HTTP message to the Web Server 406 to keep the session id in the Location Server 410 valid.
15. The Web Server 406 sends a confirmation message for the "keep-alive" message.
16. When the Web Client 400 connection is broken (for example, the web browser window or tab is closed normally) or when the "keep-alive" time is expired, the Web Server 406 removes the session id information from the Location Server 410.

4.2. Call Initiation

Figure 6:
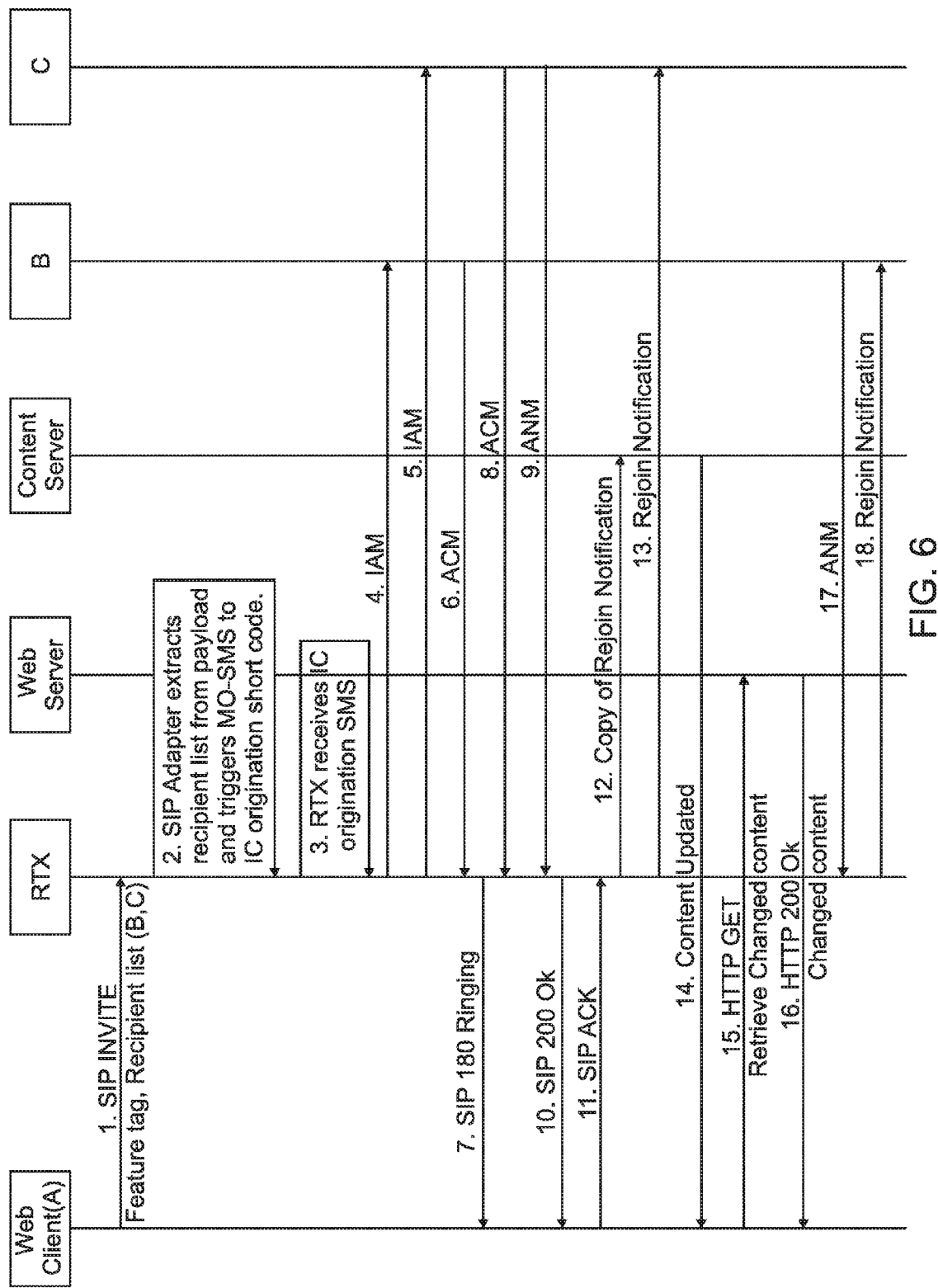
FIG. 6 is a call flow diagram that illustrates the steps performed during Call Initiation in one embodiment of the present invention.

FIG. 6 is a call flow diagram that illustrates the steps performed during Call Initiation in one embodiment of the present invention. The steps include the following:
1. The user selects contacts B and C and initiates, for example, an AGC call, such as an Instant Conference (IC)

call. The Web Client 400 creates and sends a SIP INVITE request containing the list of recipients. The SIP INVITE request also contains the feature tag for IC call. This is used to route the IC call to the RTX 102. The request is addressed to a unique well known URI set up for IC calls. This URI could be the same E.164 number or short code used for IC origination.

2. The SIP adapter at the RTX 102 extracts the recipients list from the SIP INVITE and triggers an MO-SMS containing the recipient list.

3. The RTX 102 receives the MO-SMS with the recipient list and processes the SIP INVITE.

4. The RTX 102 originates the call to B.

5. The RTX 102 originates the call to C.

6. The RTX 102 receives an ACM from B.

7. Since this is the first ACM received for the call, the RTX 102 sends a SIP 180 Ringing response to A.

8. The RTX 102 receives an ACM from C.

9. User C answers the call first. The RTX 102 receives an ANM from C.

10. Since this is the first ANM for the call, the RTX 102 now establishes the call and sends a SIP 200 Ok response to A.

11. A's Web Client 400 creates and sends an ACK to complete the INVITE transaction.

12. The RTX 102 knows that A has initiated the IC call from a Web Client 400. So, the RTX 102 sends a copy of the IC call rejoin notification in the Content Server 414 against user A's data. This is in addition to the regular SMS notification sent to A's handset (which is not shown in the flow).

13. The RTX 102 sends a regular SMS notification to C.

14. The Content Server 414 detects a change in user A's data and sends a notification to A's Web Client 400 that the data has changed, asking it to retrieve the data. This notification is sent within the SUBSCRIBE dialog established for presence and data change notifications.

15. User A's Web Client 400 uses HTTP to retrieve the notification and sends a HTTP request to the Web Server 406.

16. The Web Server 406 sends the changed data that includes the rejoin notification.

17. User B answers the call and is joined into the conference by the RTX 102.

18. The RTX 102 sends a rejoin notification to B.

4.3. Call Termination

Figure 7:
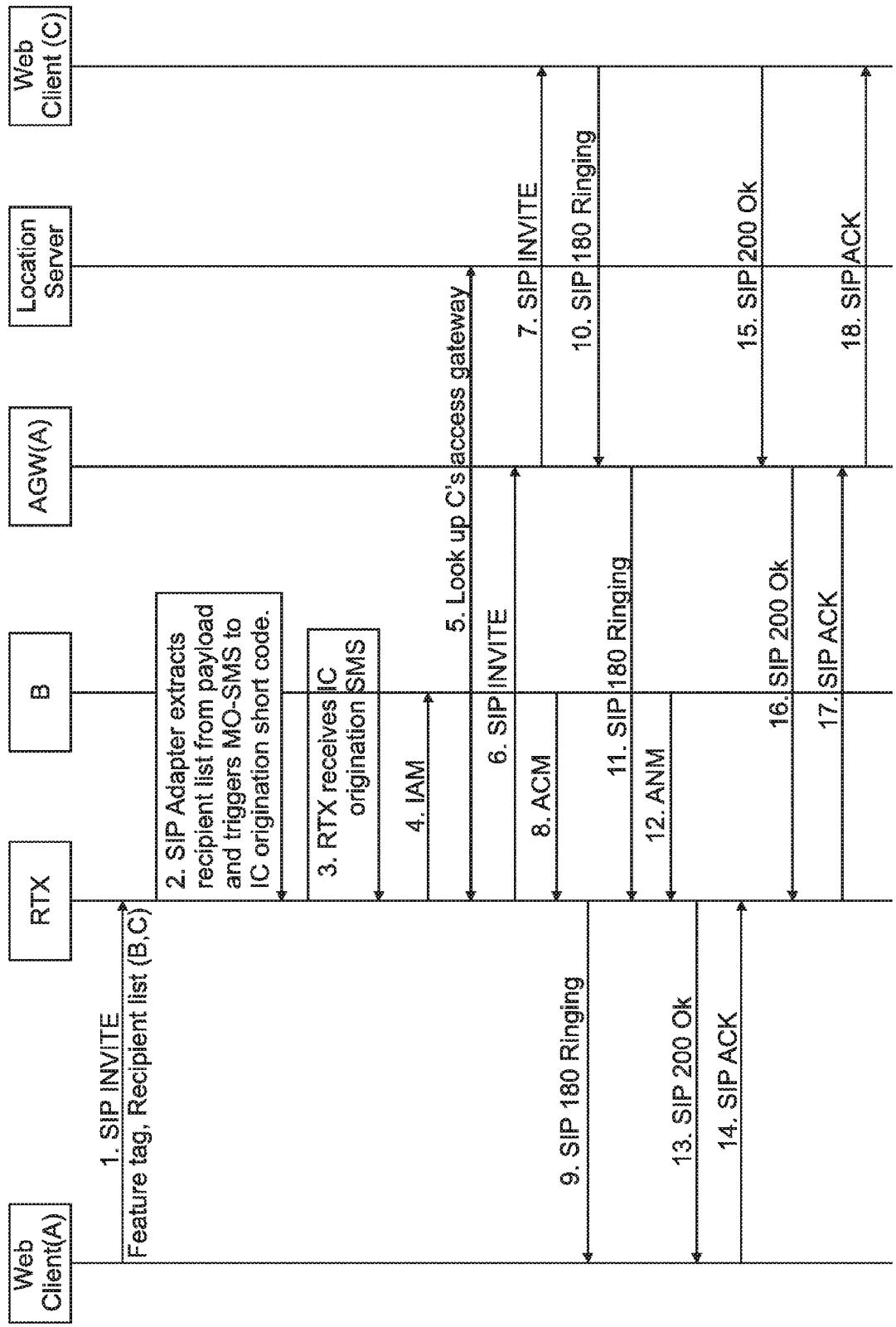
FIG. 7 is a call flow diagram that illustrates the steps performed during Call Termination in one embodiment of the present invention.

FIG. 7 is a call flow diagram that illustrates the steps performed during Call Termination in one embodiment of the present invention. The steps include the following:

1. User selects contacts B and C and initiates an AGC call, such as an IC call. The Web Client 400 creates and sends a SIP INVITE request containing the list of recipients. The SIP INVITE request also contains the feature tag for the IC call. This is used to route the IC call to the RTX 102. The request is addressed to a unique well known URI set up for IC calls. This URI could be the same E.164 number or short code used for IC origination.

2. The SIP adapter at the RTX 102 extracts the recipients list from the SIP INVITE and triggers an MO-SMS containing the recipient list.

3. The RTX 102 receives the MO-SMS with the recipient list and processes the SIP INVITE.

4. The RTX 102 originates a call to B.

5. The RTX 102 detects that user C is logged in through the Web Client 400. It looks up the Location Server 410 and finds the AGW 402 through which it can reach C.

6. The RTX 102 originates a SIP call to C and sends it to the AGW 402 for C.

7. The AGW 402 forwards the call to C.

8. In the meantime, the RTX 102 receives an ACM from B.

9. Since this is the first ACM for this call, the RTX 102 sends a SIP 180 Ringing response to A.

10. C's Web Client 400 receives the SIP INVITE and sends a SIP 180 Ringing response to its AGW 402.

11. The AGW 402 forwards the response to the RTX 102.

12. User B answers the call and the RTX 102 receives an ANM from B.

13. Since this is the first ANM for this call, the RTX 102 sends a SIP 200 Ok response to A.

14. A's Web Client 400 sends a SIP ACK to complete the SIP INVITE transaction.

15. User C answers the call. C's Web Client 400 sends a SIP 200 Ok response to the AGW 402.

16. The AGW 402 forwards the response to the RTX 102.

17. The RTX 102 sends a SIP ACK to complete the transaction.

18. The AGW 402 receives the SIP ACK message and forwards it to C's Web Client 400.

Rejoin notification flows are not shown in this flow, as they are similar to the one shown in the Call Initiation flow.

4.4. Simultaneous Ringing

Figure 8:
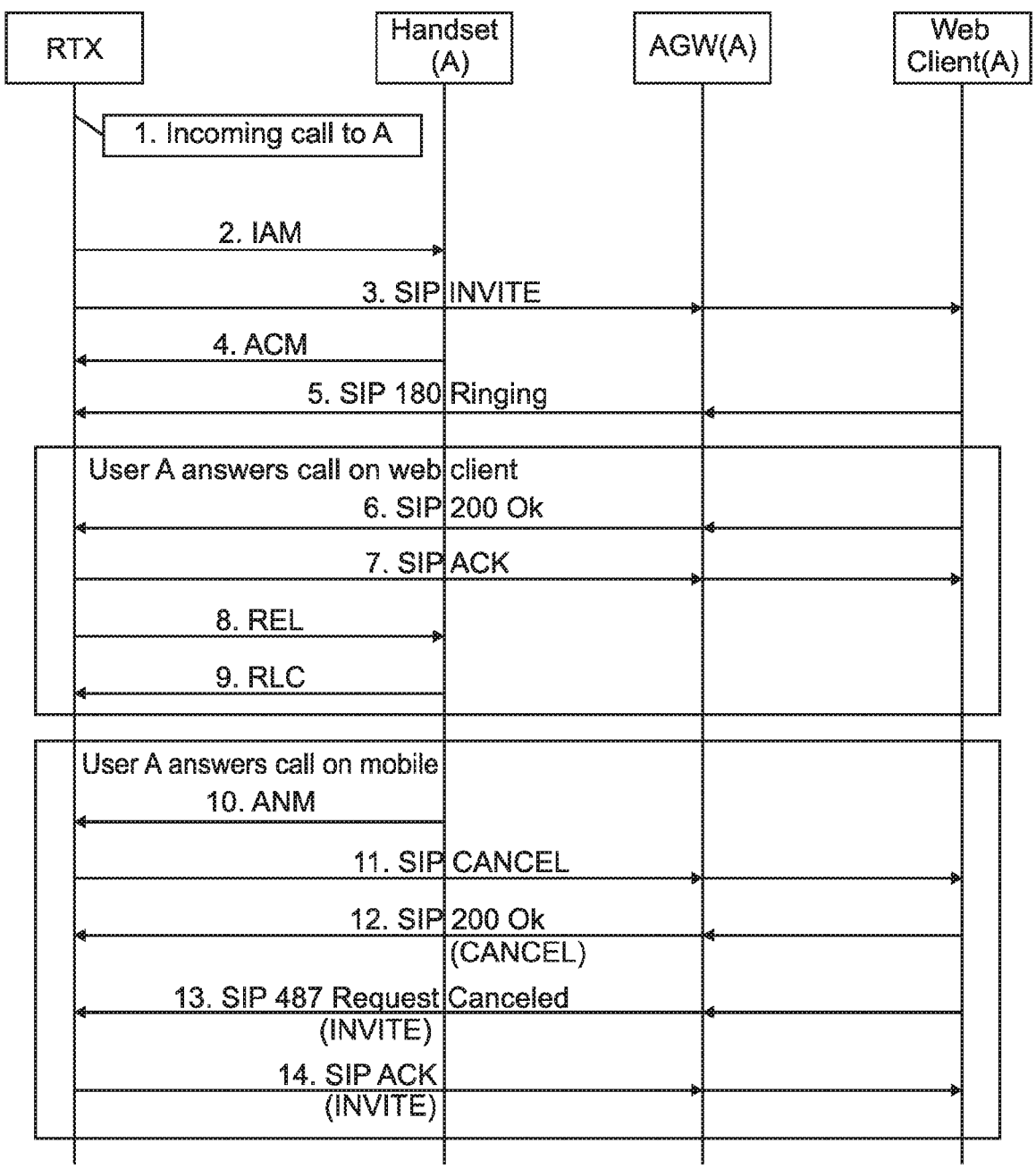
FIG. 8 is a call flow diagram that illustrates the steps performed during Simultaneous Ringing on both a handset and a Web client in one embodiment of the present invention.

FIG. 8 is a call flow diagram that illustrates the steps performed during Simultaneous Ringing on both the handset 120 and Web Client 400 in one embodiment of the present invention. The steps include the following:

1. The RTX 102 receives an incoming call to user A. The RTX 102 determines that user A can be reached through the handset 120 as well as the Web Client 400. The RTX 102 looks up the AGW 402 through which A's Web Client 400 can be reached, in a manner similar to the mechanism shown in the Call Termination message flow.

2. The RTX 102 places the call to the handset 120 using SS7 signaling.

3. The RTX 102 places the call to the Web Client 400 through the AGW 402 using SIP signaling 4. A's handset 120 receives the call and sends an alerting response.

5. A's Web Client 400 receives a SIP INVITE and sends an alerting response through the AGW 402.

Messages #6 to #9 show the message flow when user A answers the call on the Web Client 400.

6. The Web Client 400 sends a SIP 200 Ok response to accept the call.

7. The RTX 102 connects the Web Client 400 and sends a SIP ACK message to complete the transaction.

8. The RTX 102 then releases the call on A's handset 120.

9. The handset 120 sends an RLC to complete the transaction.

Messages #10 to #14 show the message flow when user A answers the call on the handset 120.

10. A's handset 120 sends an ANM message to accept the call.

11. The RTX 102 connects A's handset 120 to the call and sends a SIP CANCEL request to the Web Client 400 to drop the SIP call leg.

12. The Web Client 400 sends a SIP 200 Ok for the CANCEL transaction.

13. The Web Client 400 then sends a SIP 487 Request Canceled response for the INVITE transaction to the RTX 102 to indicate that the request was canceled by the RTX 102.

14. The RTX 102 sends a SIP ACK to complete the INVITE transaction.

4.5. Call Transfer from Web Client to Handset

Figure 9:
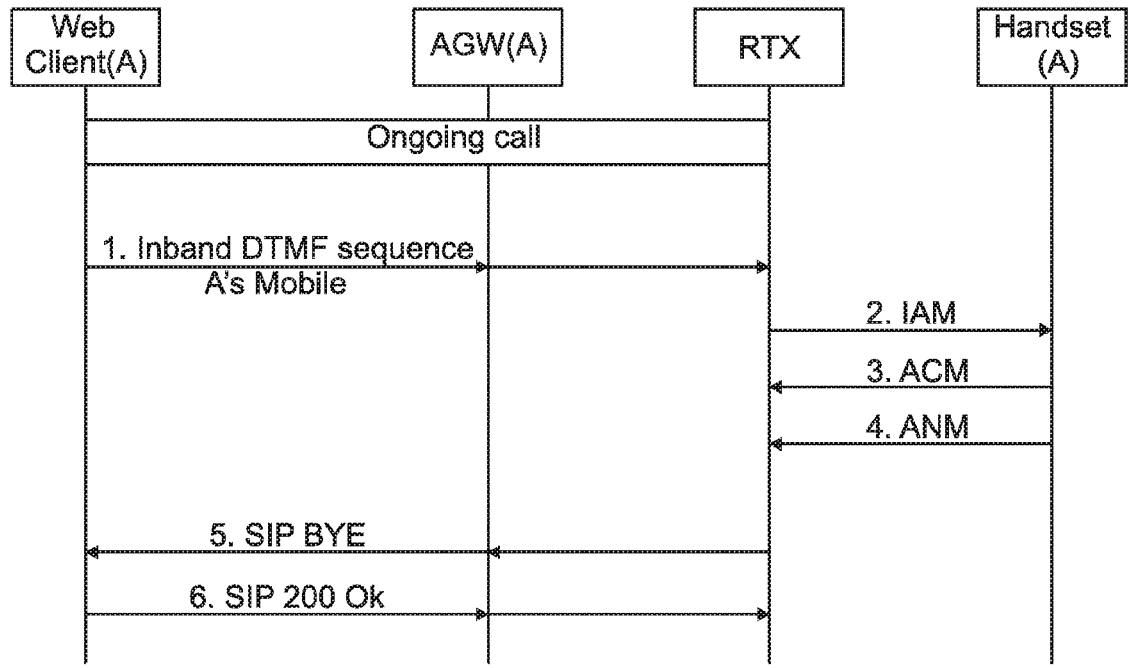
FIG. 9 is a call flow diagram that illustrates the steps performed during Call Transfer, from a Web client to a handset, in one embodiment of the present invention.

FIG. 9 is a call flow diagram that illustrates the steps performed during Call Transfer, from the Web Client 400 to the handset 120, in one embodiment of the present invention.

The steps include the following:

1. User A is on a call on the Web Client 400. User A wants to transfer the call to the handset 120 and continue the call. User A enters the appropriate DTMF sequence on the Web Client 400 and the handset sends these DTMF signals in-band to the RTX 102.

2. The RTX 102 receives the DTMF signals and interprets the signals as a call transfer from the Web Client 400 to the handset 120. It sends a SS7 IAM message to A's handset 120.

3. A's handset 120 receives the IAM message, presents the call to the user and sends an ACM message to the RTX 102.

4. User A now answers the call on the handset 120. A's handset 120 sends an ANM message to the RTX 102 to accept the call. The RTX 102 connects the handset 120 call leg to the ongoing call.

5. The RTX 102 now disconnects the Web Client 400 call leg by sending a SIP BYE to the Web Client 400 through the AGW 402.

6. The Web Client 400 completes the transaction by sending a SIP 200 Ok response to the RTX 102 through the AGW 402.

4.6. Call Transfer from Handset to Web Client

Figure 10:
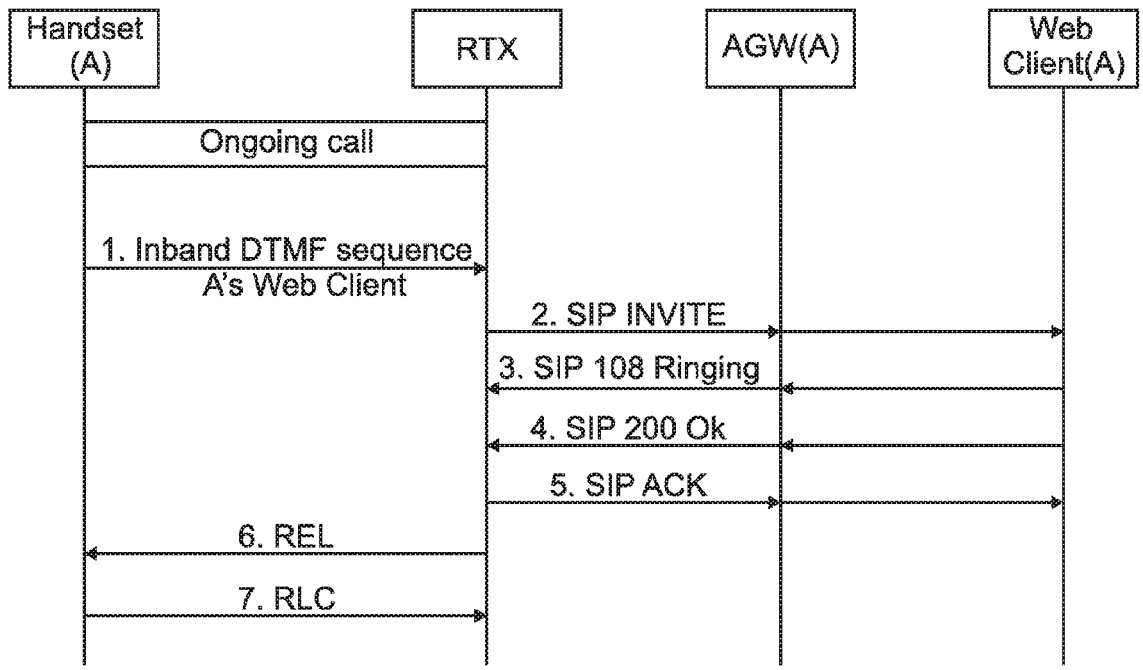
FIG. 10 is a call flow diagram that illustrates the steps performed during Call Transfer, from a handset to Web client, in one embodiment of the present invention.

FIG. 10 is a call flow diagram that illustrates the steps performed during Call Transfer, from the handset 120 to the Web Client 400, in one embodiment of the present invention. The steps include the following:

1. User A is on a call on the handset 120. User A wants to transfer the call to the Web Client 400 and continue the call. User A presses the appropriate DTMF sequence on the handset 120. The handset 120 sends these DTMF signals in-band to the RTX 102.

2. The RTX 102 receives the DTMF signals and interprets the signals as a call transfer to the Web Client 400. It sends a SIP INVITE message to A's Web Client 400 through the AGW 102.

3. The Web Client 400 receives the INVITE, presents the call to the user and sends a SIP 180 Ringing response to the RTX 102 through the AGW 402.

4. User A now answers the call on the Web Client 400. The Web Client 400 sends a SIP 200 Ok response to the RTX 102.

5. The RTX 102 sends a SIP ACK message back to the Web Client 400 to complete the INVITE transaction, after connecting the Web Client 400 call leg to the ongoing call.

6. The RTX 102 now disconnects the handset 120 call leg by sending a REL message to the handset 120.

7. The handset 120 sends a RLC response to the RTX 102 to complete the transaction.

4.7. Call Hold

The Call Hold function performed by the Web Client 400 is performed through normal SIP mechanisms, and thus the message flow is not shown herein.

4.8. Presence Publish

Figure 11:
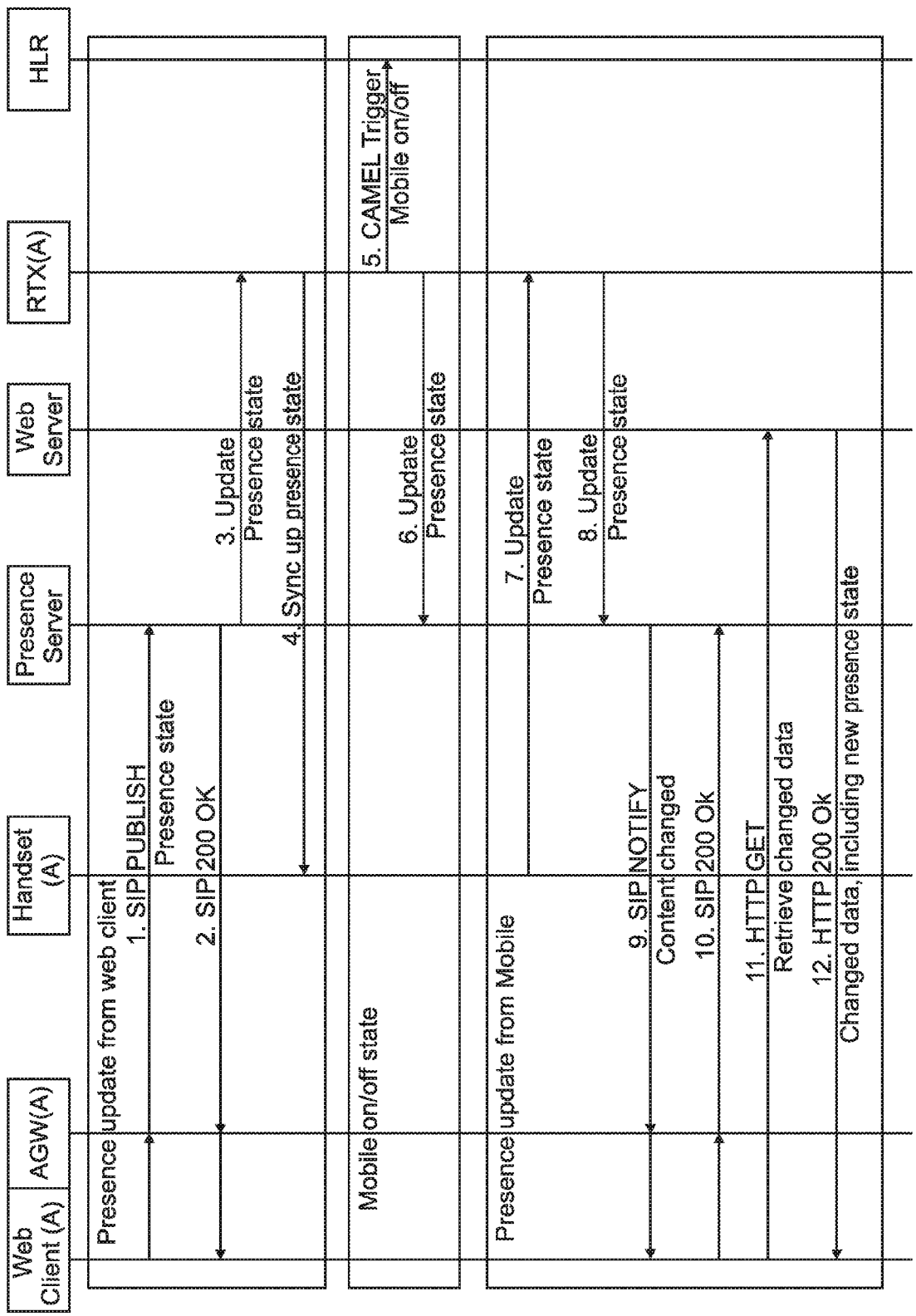
FIG. 11 is a call flow diagram that illustrates the steps performed during Presence Publication in one embodiment of the present invention.

FIG. 11 is a call flow diagram that illustrates the steps performed during Presence Publication in one embodiment of the present invention. In the Presence Publication function, presence updates are received from the Web Client 400 and the handset 120, and stored on the Presence Server 408. This diagram also describes how the new presence state is synchronized between the handset 120 and the Web Client 400. The steps include the following:

1. The Web Client 400 sends a SIP PUBLISH through the AGW 402 to the Presence Server 408 with the presence state set by the user.

2. The Presence Server 408 receives the presence state and sends a SIP 200 Ok response back to complete the transaction.

3. The Presence Server 408 sets its current time stamp to the presence state and updates the Presence Server 202.

4. The Presence Server 202 synchronizes the new presence state with the handset 120 using the Presence Server 202 protocol.

5. The HLR 132 detects changes in the on/off state of the handset 120 and reports these changes to the Presence Server 202 in the RTX 102.

6. The Presence Server 202 in the RTX 102 updates the Presence Server 408 with the new presence state for handset 120.

7. The handset 120 sends a presence state update to the Presence Server 202 in the RTX 102.

8. The Presence Server 202 in the RTX 102 updates the presence state to the Presence Server 408.

9. The Presence Server 408 sets its current time stamp to the presence state, and then sends a SIP NOTIFY message on the presence/data change SUBSCRIBE dialog to the Web Client 400.

10. The Web Client 400 receives the SIP NOTIFY message and sends back a SIP 200 Ok response to complete the transaction.

11. The Web Client 400 sends a HTTP GET request to the Web Server 406 to retrieve the changed data, which includes the new presence state.

12. The Web Server 406 sends the changed data to the Web Client 400 in the HTTP 200 Ok response.

4.9. Presence Subscription

Figure 12:
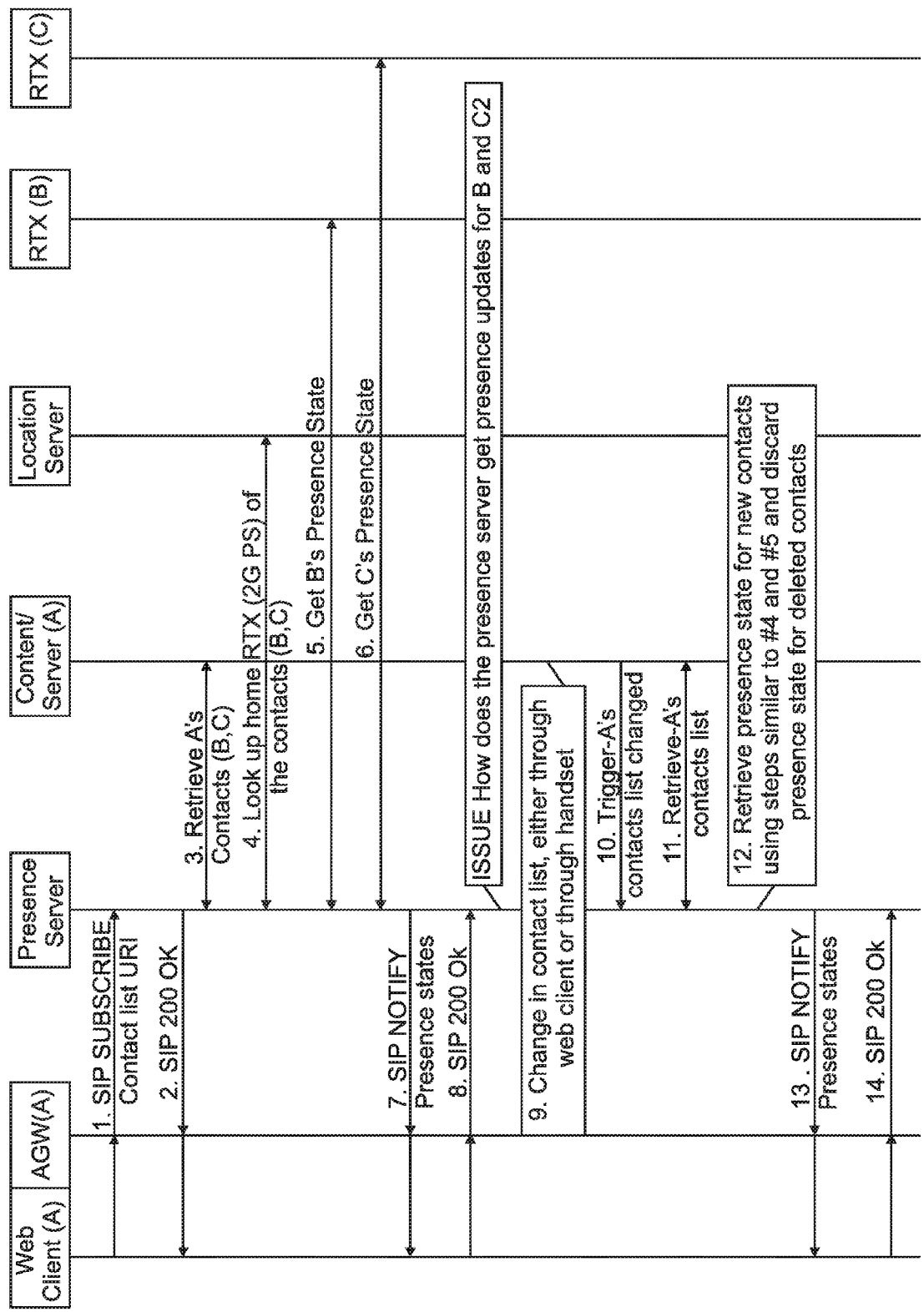
FIG. 12 is a call flow diagram that illustrates the steps performed during Presence Subscription in one embodiment of the present invention.

FIG. 12 is a call flow diagram that illustrates the steps performed during Presence Subscription in one embodiment of the present invention. The steps include the following:

1. User A's Web Client 400 subscribes to the presence states of all of A's contacts by sending a single SIP SUBSCRIBE request to the Presence Server 408. The request is addressed to a special URI (e.g. contacts-username@operator.com) that is understood by the Presence Server 408 to mean all contacts of the user.

2. The Presence Server 408 receives the request and sends a SIP 200 Ok response to complete the transaction.

3. The Presence Server 408 then retrieves the list of A's contacts from the Content Server 414 where A's data is stored (as determined through the Location Server 410, which is not shown in the message flow). In this message flow, user A is assumed to have B and C as contacts, both of whom are RTX 102 subscribers.

4. After the list of contacts is obtained, the Presence Server 408 determines which of the contacts are RTX 102 subscribers and obtains their home RTX 102 information from the Location Server 410.

5. The Presence Server 408 retrieves B's presence state from B's home RTX 102.

6. The Presence Server 408 retrieves C's presence state from C's home RTX 102.

7. After obtaining the presence states of all contacts who are RTX 102 subscribers, the Presence Server 408 creates and sends a SIP NOTIFY message to the Web Client 400. The SIP NOTIFY message contains the presence information of these contacts.

8. The Web Client 400 receives the SIP NOTIFY message and sends a SIP 200 Ok response to complete the transaction.

One issue that exists is how does the Presence Server 408 obtain updates to B and C's presence states? It is expected that, as soon as a contact changes his/her presence state, subscribers to that presence state should be notified. For example, a suggested solution is for the Presence Server 202 in the home RTX 102 to report presence state change of any of their subscribers to the Presence Server 408 immediately.

Then, it is up to the Presence Server 408 to determine who has subscribed to presence information for this subscriber and notify them appropriately.

9. The contact list maintained at the Content Server 414 for user A may be modified, either through the Web Client 400 or through the handset 120 (these messages are not shown).

10. The Content Server 414 notifies the Presence Server 408 that A's contact list has changed.

11. The Presence Server 408 retrieves the new set of contacts from the Content Server 414.

12. The Presence Server 408 retrieves the presence states for any added or modified contacts and discards the presence states for any deleted contacts.

13. The Presence Server 408 creates and sends a SIP NOTIFY message to the Web Client 400, containing the presence states of the contacts.

14. The Web Client 400 receives the SIP NOTIFY and sends a SIP 200 Ok response back to complete the transaction.

4.10. Group SMS Origination and Notification Delivery

Figure 13:
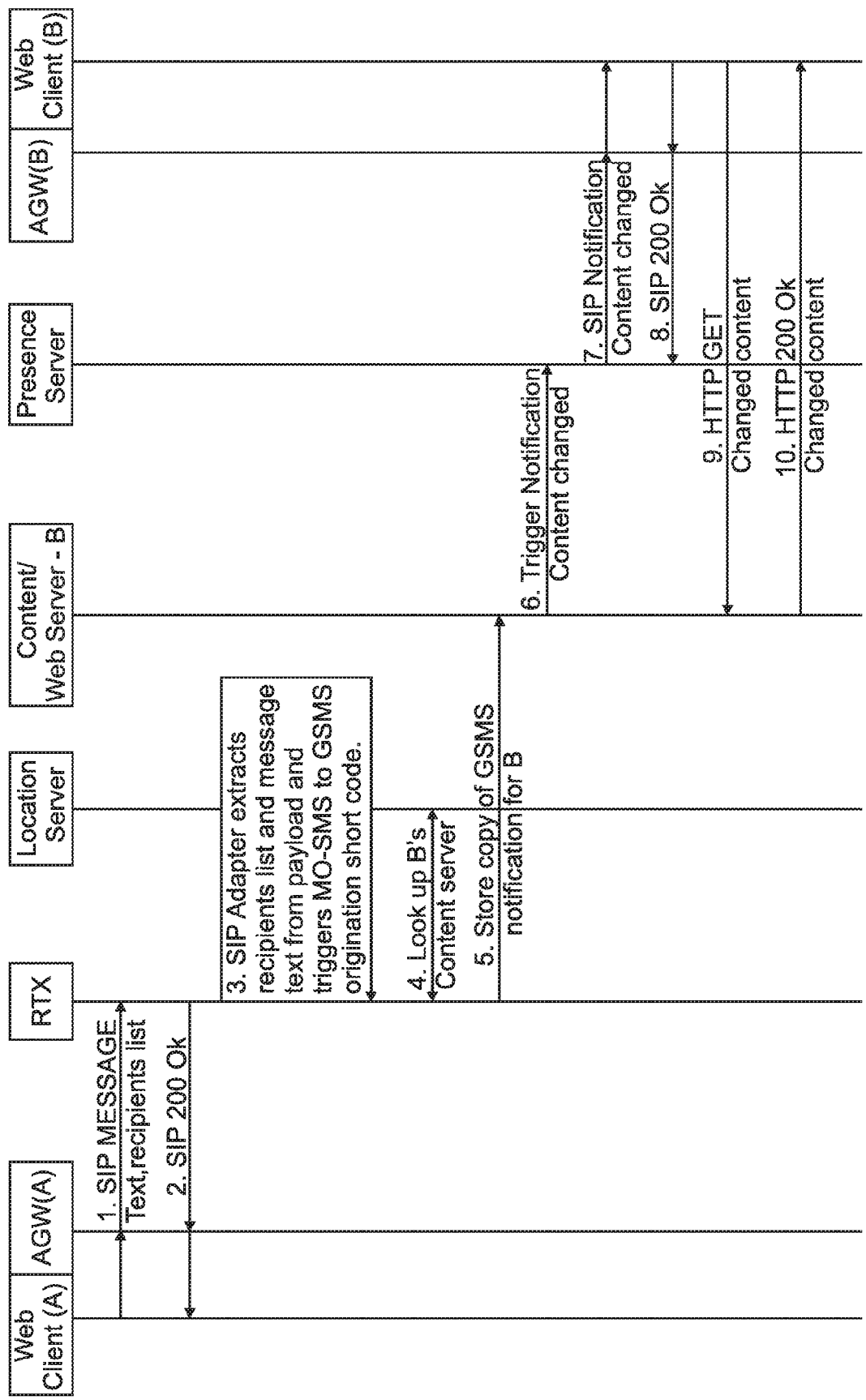
FIG. 13 is a call flow diagram that illustrates the steps performed during Group Short Message Service Origination and Notification Delivery in one embodiment of the present invention.

FIG. 13 is a call flow diagram that illustrates the steps performed during Group SMS Origination and Notification Delivery in one embodiment of the present invention. The steps include the following:

1. User A selects multiple contacts and initiates a Group SMS (GSM) message. The selected contacts include user B, who also uses the Web Client 400. (Message flows for the other contacts are not shown, as the messaging is through the regular SMS mechanism.) User A's Web Client 400 accepts the message text, and creates and sends a SIP MESSAGE request to the RTX 102 containing the message text and the list of recipients.

2. The RTX 102 receives the SIP MESSAGE request and sends back a SIP 200 Ok response to complete the transaction.

3. The SIP adapter in the RTX 102 parses the message and triggers a MO-SMS in the GSMS format to be sent to the GSMS module of the RTX 102 (not shown).

4. The GSMS module of the RTX 102 receives the MO-SMS and processes it for all recipients (including B's handset 120). In doing so, it determines that user B also runs a Web Client 400, and thus looks up the Location Server 410 to determine which Content Server 414 stores B's data.

5. The RTX 102 stores a copy of the GSMS notification in the Content Server 414 along with the rest of B's data.

6. The Content Server 414 detects a change in B's data and notifies the Presence Server 408.

7. The Presence Server 408 creates and sends a SIP NOTIFY request to B's Web Client 400. The NOTIFY request indicates that B's data has changed on the Content Server 414. This NOTIFY message is sent in the SIP SUBSCRIBE dialog created for presence and data change.

8. The Web Client 400 receives the NOTIFY request and sends a SIP 200 Ok response to complete the transaction.

9. The Web Client 400 then sends a HTTP GET request to the Web Server 406 to retrieve the changed data.

10. The Web Server 406 sends a HTTP 200 Ok response with the changed data, wherein the changed data includes the new GSMS notification.

4.11. SMS Notification Delivery

The RTX 102 delivers other connected service notifications in the same manner as shown in messages #4 to #10 in the GSMS message flow of FIG. 13.

4.12. Data Synchronization

Figure 14:
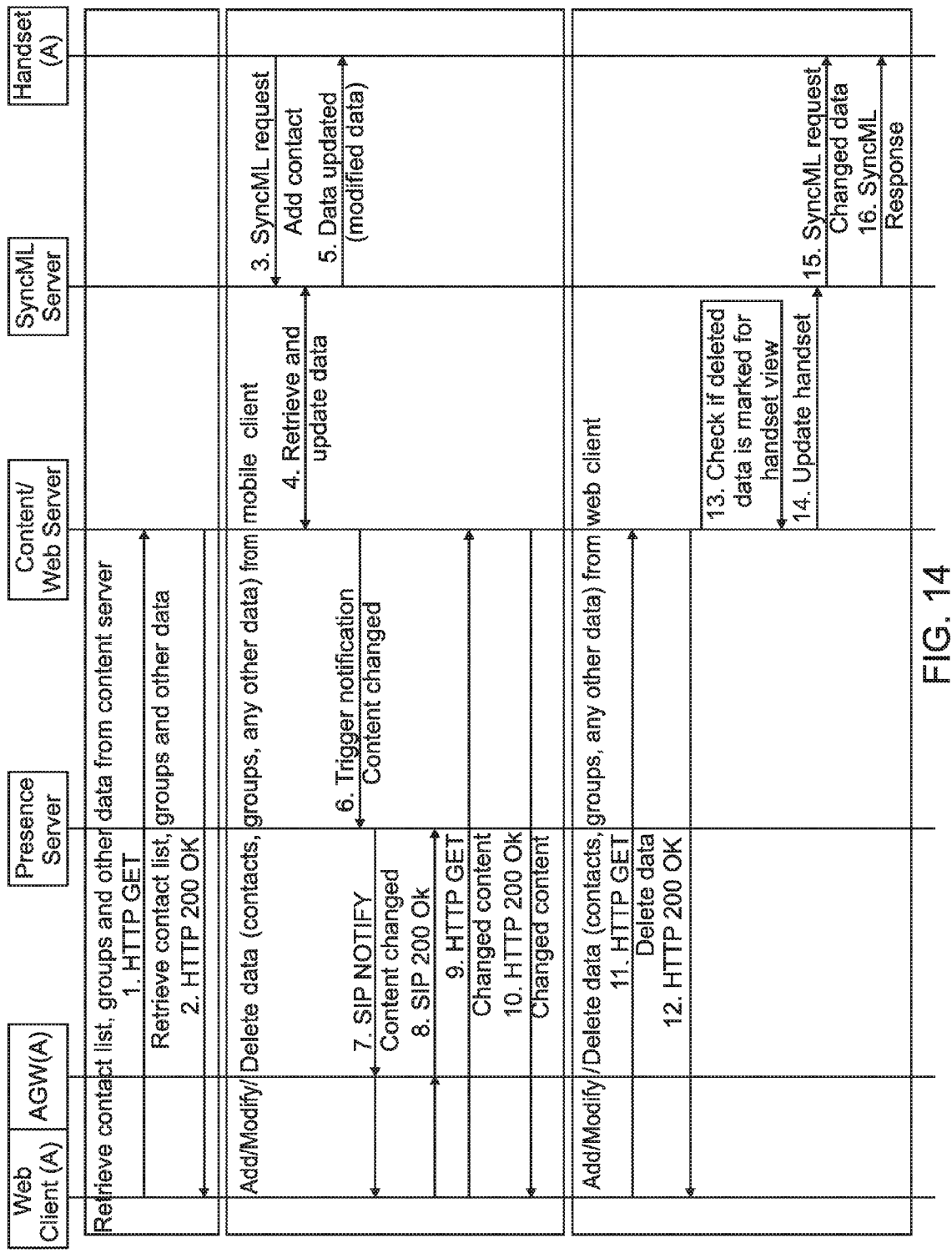
FIG. 14 is a call flow diagram that illustrates the steps performed during Data Synchronization in one embodiment of the present invention.

FIG. 14 is a call flow diagram that illustrates the steps performed during Data Synchronization in one embodiment of the present invention.

In this figure, message flows are shown for various scenarios:

Messages #1 to #2: Data retrieval immediately after login or when the user selects a refresh option.

Messages #3 to #10: Data modification from the handset 120. This includes adding, modifying or deleting contacts or groups, etc. (essentially anything that changes the view on the Web Client 400). The example in the call flow shows adding a contact.

Messages #11 to #16: Data modification from the Web Client 400. The example shows deleting data that is marked for view on the handset 120. For modifications that do not affect the handset 120, messages #14 to #16 will not be used.

The steps of FIG. 14 include the following:

1. The Web Client 400 sends a HTTP request to the Web Server 406 to retrieve the various data for display. This may include contacts, groups (group members are downloaded when a group is opened and are retained in memory thereafter), one or two screens worth of message notifications (older notifications are downloaded upon user request). For VSMS, only the notifications are downloaded; the audio data is downloaded and played when the user opens the message to listen to the message.

2. The Web Server 406 retrieves the requested data from the Content Server 414 and includes them in the message body of an HTTP 200 Ok response.

3. User A adds a contact on the handset 120. The handset 120 sends a SyncML request to the SyncML Server 412 with the added data.

4. The SyncML Server 412 interacts with the Content Server 414 to retrieve and add the new data, and then stores the modified data back into the Content Server 414.

5. The SyncML Server 412 sends the modified data back to the handset 120 in the response message.

6. The Content Server 414 detects the change in user A's data and triggers the Presence Server 408 to send a SIP NOTIFY message to the Web Client 400.

7. The Presence Server 408 sends a SIP NOTIFY message to the Web Client 400 through A's AGW 402. The SIP NOTIFY is sent within the SUBSCRIBE dialog created earlier by the Web Client 400 for presence and data change.

8. The Web Client 400 receives the SIP NOTIFY request and sends back a SIP 200 Ok response to the Presence Server 408 through the AGW 402.

9. The Web Client 400 then sends a HTTP request to the Web Server 406 to retrieve the changed data.

10. The Web Server 406 retrieves the changed data from the Content Server 414 and returns them in the HTTP 200 Ok response.

11. User A deletes a notification message from the Web Client 400. This notification happens to be marked as visible on the handset 120. The Web Client 400 creates and sends a HTTP request to the Web Server 406 to delete the notification.

12. The Web Server 406 accesses the Content Server 414 and marks the notification message for deletion. It then sends a HTTP 200 Ok response to the Web Client 400 to indicate successful deletion of the notification message.

13. The Content Server 414 detects the data marked for deletion, initiated by the Web Client 400. It checks whether the data to be deleted is marked as visible on the handset 120.

14. Since the data is marked as visible on the handset 120, the Content Server 414 triggers the SyncML Server 412 to update the handset 120.

15. The SyncML Server 412 sends a SyncML request to the handset 120 to update its data, specifying the deleted notification.

16. The handset 120 updates its data and sends a SyncML response back to the SyncML Server 412 to indicate successful completion of the request.

5. Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing a converged mobile-Web communications solution, comprising:
   a mobile phone network for making phone calls and exchanging data to and from at least one mobile phone, wherein the phone calls are made and the data is exchanged using connections that are initiated by call setup and in-band signaling within the mobile phone network and frames for the phone calls and the data are switched to and from the mobile phone by at least one mobile switching center across bearer paths in the mobile phone network;
   a real-time exchange that interfaces to at least one mobile switching center in the mobile phone network to provide advanced voice services therein, without requiring any changes to the mobile switching center or other equipment of the mobile phone network to provide the advanced voice services;
   wherein both the real-time exchange and the mobile phones that use the advanced voice services communicate with each other using the call setup and in-band signaling within the mobile phone network, such that at least one mobile switching center routes an originating leg of the advanced voice services from an originating mobile phone to the real-time exchange, the real-time exchange initiates one or more terminating legs of the advanced voice services to one or more terminating mobile phones through at least one mobile switching center, and the real-time exchange switches the voice frames for the advanced voice services for the mobile phones across the bearer paths and through at least one mobile switching center in the mobile phone network;
   wherein the real-time exchange interfaces to one or more Internet or Intranet networks for exchanging data to and from at least one Web client in the Internet or Intranet networks, in order to provide the advanced voice services to the Web client in the Internet or Intranet networks; and
   wherein additional network components are implemented that interface to the mobile phone network and the Internet or Intranet networks, for providing a converged mobile-Web communications solution to both the mobile phone in the mobile phone network and the Web client in the Internet or Intranet networks, wherein the converged mobile-Web communications solution comprises services that are provided to the mobile phone in the mobile phone network that are also provided to the Web client in the Internet or Intranet networks.

2. The system of claim 1, wherein the converged mobile-Web communications solution comprises means for providing the Web client with access to the mobile phone's contacts.

3. The system of claim 1, wherein the converged mobile-Web communications solution comprises means for providing the Web client with access to the mobile phone's text messaging.

4. The system of claim 1, wherein the converged mobile-Web communications solution comprises means for allowing the Web client to send text messages to one or more recipient mobile phones in the mobile phone network.

5. The system of claim 1, wherein the converged mobile-Web communications solution comprises means for providing the Web client with access to the mobile phone's voice messaging.

6. The system of claim 1, wherein the converged mobile-Web communications solution comprises means for allowing the Web client to send multimedia files to one or more recipient mobile phones in the mobile phone network.

7. The system of claim 1, wherein the converged mobile-Web communications solution comprises means for allowing the Web client to place a group call to a plurality of recipient mobile phones in the mobile phone network.

8. The system of claim 1, wherein the converged mobile-Web communications solution comprises means for performing simultaneous ringing to both the mobile phone in the mobile phone network and the Web client in the Internet or Intranet network.

9. The system of claim 1, wherein the converged mobile-Web communications solution comprises means for transferring calls from the mobile phone in the mobile phone network to the Web client in the Internet or Intranet network.

10. The system of claim 1, wherein the converged mobile-Web communications solution comprises means for transferring calls from the Web client in the Internet or Intranet network to the mobile phone in the mobile phone network.

11. The system of claim 1, wherein the converged mobile-Web communications solution comprises means for synchronizing data between the mobile phone in the mobile phone network and the Web client in the Internet or Intranet network.

12. A method for providing a converged mobile-Web communications solution, comprising:
   providing a mobile phone network for making phone calls and exchanging data to and from at least one mobile phone, wherein the phone calls are made and the data is exchanged using connections that are initiated by call setup and in-band signaling within the mobile phone network and frames for the phone calls and the data are switched to and from the mobile phone by at least one mobile switching center across bearer paths in the mobile phone network;
   interfacing a real-time exchange to at least one mobile switching center in the mobile phone network to provide advanced voice services therein, without requiring any changes to the mobile switching center or other equipment of the mobile phone network to provide the advanced voice services;
   wherein both the real-time exchange and the mobile phones that use the advanced voice services communicate with each other using the call setup and in-band signaling within the mobile phone network, such that at least one mobile switching center routes an originating leg of the advanced voice services from an originating mobile phone to the real-time exchange, the real-time exchange initiates one or more terminating legs of the advanced voice services to one or more terminating mobile phones through at least one mobile switching center, and the real-time exchange switches the voice frames for the advanced voice services for the mobile phones across the bearer paths and through at least one mobile switching center in the mobile phone network;

interfacing the real-time exchange to one or more Internet or Intranet networks for exchanging data to and from at least one Web client in the Internet or Intranet networks, in order to provide the advanced voice services to the Web client in the Internet or Intranet networks; and implementing additional network components that interface to the mobile phone network and the Internet or Intranet networks, for providing a converged mobile-Web communications solution to both the mobile phone in the mobile phone network and the Web client in the Internet or Intranet networks, wherein the converged mobile-Web communications solution comprises services that are provided to the mobile phone in the mobile phone network that are also provided to the Web client in the Internet or Intranet networks.

13. The method of claim 12, wherein the converged mobile-Web communications solution comprises providing the Web client with access to the mobile phone's contacts.

14. The method of claim 12, wherein the converged mobile-Web communications solution comprises providing the Web client with access to the mobile phone's text messaging.

15. The method of claim 12, wherein the converged mobile-Web communications solution comprises allowing the Web client to send text messages to one or more recipient mobile phones in the mobile phone network.

16. The method of claim 12, wherein the converged mobile-Web communications solution comprises providing the Web client with access to the mobile phone's voice messaging.

17. The method of claim 12, wherein the converged mobile-Web communications solution comprises allowing the Web client to send multimedia files to one or more recipient mobile phones in the mobile phone network.

18. The method of claim 12, wherein the converged mobile-Web communications solution comprises allowing the Web client to place a group call to a plurality of recipient mobile phones in the mobile phone network.

19. The method of claim 12, wherein the converged mobile-Web communications solution comprises performing simultaneous ringing to both the mobile phone in the mobile phone network and the Web client in the Internet or Intranet network.

20. The method of claim 12, wherein the converged mobile-Web communications solution comprises transferring calls from the mobile phone in the mobile phone network to the Web client in the Internet or Intranet network.

21. The method of claim 12, wherein the converged mobile-Web communications solution comprises transferring calls from the Web client in the Internet or Intranet network to the mobile phone in the mobile phone network.

22. The method of claim 12, wherein the converged mobile-Web communications solution comprises synchronizing data between the mobile phone in the mobile phone network and the Web client in the Internet or Intranet network.

* * * * *